United States Patent
Fotsing et al.

(10) Patent No.: US 11,548,994 B2
(45) Date of Patent: Jan. 10, 2023

(54) OPENLY POROUS ACOUSTIC FOAM, PROCESS FOR MANUFACTURE AND USES THEREOF

(71) Applicant: SAFRAN, Paris (FR)

(72) Inventors: Edith Roland Fotsing, Mascouche (CA); Arnaud Dubourg, Saint Medard en Jalles (FR); Annie Ross, St-Lazare (CA)

(73) Assignee: SAFRAN, Paris (FR)

( * ) Notice: Subject to any disclaimer, the term of this patent is extended or adjusted under 35 U.S.C. 154(b) by 804 days.

(21) Appl. No.: 16/466,127

(22) PCT Filed: Dec. 1, 2017

(86) PCT No.: PCT/CA2017/051446
§ 371 (c)(1),
(2) Date: Jun. 3, 2019

(87) PCT Pub. No.: WO2018/098585
PCT Pub. Date: Jun. 7, 2018

(65) Prior Publication Data
US 2020/0157305 A1    May 21, 2020

Related U.S. Application Data

(60) Provisional application No. 62/429,346, filed on Dec. 2, 2016.

(51) Int. Cl.
*C08J 9/26*     (2006.01)
*G10K 11/162*   (2006.01)

(52) U.S. Cl.
CPC ............... *C08J 9/26* (2013.01); *G10K 11/162* (2013.01); *C08J 2201/0446* (2013.01);
(Continued)

(58) Field of Classification Search
CPC .. C08J 9/26; C08J 2201/0446; C08J 2205/05; C08J 2300/24; C08J 2333/14;
(Continued)

(56) References Cited

U.S. PATENT DOCUMENTS

| 2,751,289 A | 6/1956 | Elliott | |
| 3,379,658 A * | 4/1968 | Kemper | ...................... C08J 9/26 |
| | | | 521/145 |

(Continued)

FOREIGN PATENT DOCUMENTS

CA         2057938 C     8/1995

OTHER PUBLICATIONS

Drury, W.J., Rickles, S.A. Sanders, T.H. and Cochran, J.K. Deformation energy absorption characteristics of a metal/ceramic cellular solid. In Proceedings of TMS Conference on Light Weight Alloys for Aerospace Applications, (1989) TMS-AIME, Warrendale, PA, USA.

(Continued)

*Primary Examiner* — Kara B Boyle
(74) *Attorney, Agent, or Firm* — Pillsbury Winthrop Shaw Pittman LLP

(57) ABSTRACT

There is provided a method of manufacturing an openly and highly porous thermoset foam, the method comprising the steps of mixing a thermosetting resin and crystals to form a mixture; applying pressure to the mixture to expel excess thermosetting resin, thereby producing a network of crystals touching each other with the thermosetting resin filling the interstices between the crystals of said network; curing the thermosetting resin in the mixture under pressure to produce a cured material; and contacting the cured material with a solvent for the crystals, thereby leaching the crystals out of the cured material, thereby obtaining said openly and highly porous thermoset foam. There is also provided a thermoset (Continued)

foam made of a thermoset and having a porosity of at least about 70%, wherein more than about 75% of the pores in the foam are connected to a neighboring pore.

14 Claims, 9 Drawing Sheets

(52) U.S. Cl.
CPC ........ *C08J 2205/05* (2013.01); *C08J 2300/24* (2013.01); *C08J 2333/14* (2013.01); *C08J 2363/00* (2013.01)

(58) Field of Classification Search
CPC .............. C08J 2363/00; C08J 2201/026; C08J 2201/044; C08J 2363/02; C08J 2367/07; C08J 2383/04; C08J 9/365; C08J 9/008; G10K 11/162
See application file for complete search history.

(56) References Cited

U.S. PATENT DOCUMENTS

| | | | |
|---|---|---|---|
| 3,816,952 A | | 6/1974 | Niebyski et al. |
| 4,076,656 A | * | 2/1978 | White .................. B29C 67/202 521/64 |
| 4,242,464 A | * | 12/1980 | Boutle ................. D06N 3/0095 521/61 |
| 4,415,512 A | | 11/1983 | Torobin |
| 4,713,277 A | | 12/1987 | Akiyama et al. |
| 4,957,543 A | | 9/1990 | Babjak et al. |
| 4,973,358 A | | 11/1990 | Jin et al. |
| 5,055,240 A | | 10/1991 | Lee et al. |
| 5,151,246 A | | 9/1992 | Baumeister et al. |
| 5,181,549 A | | 1/1993 | Shapovalov |
| 5,242,635 A | | 9/1993 | Matsumoto et al. |
| 5,281,251 A | | 1/1994 | Kenny et al. |
| 5,334,236 A | | 8/1994 | Sang et al. |
| 5,571,848 A | * | 11/1996 | Mortensen ............ B29C 67/202 524/80 |
| 2008/0234401 A1 | * | 9/2008 | Papangelou ............ A61L 27/18 521/77 |
| 2013/0171443 A1 | | 7/2013 | Morrissette et al. |
| 2015/0184789 A1 | * | 7/2015 | Hirai ..................... B29C 44/588 428/71 |

OTHER PUBLICATIONS

Iannace et al., Preparation and Characterization of Polyurethane Porous Membranes by Particulate-leaching Method, Cellular Polymers, vol. 20, No. 5, 2001, 321-338.
Kearns, M.W., Blekinsop, P.A., Barber, A.C. and Farthing, T.W. Manufacture of a novel porous metal. The International Journal of Powder Metallurgy (1988) 24, No. 1: 59-64.
Kearns, M.W., Blekinsop, P.A., Barber, A.C. and Farthing, T.W. Novel porous titanium. Paper presented at the Sixth World Conference on Titanium (1988), Cannes, France, 667-672.
Kim T. K., Yoon J. J., Lee D.S., Park T.G., Gas foamed open porous biodegradable polymeric microspheres, Biomaterials (2006), 27, 152-159.
McRae et al., Mechanical and Acoustic Performance of Compression-Molded Open-Cell Polypropylene Foams, Journal of Applied Polymer Science, vol. 116, 1106-1115, 2010.
Miyoshi, T., Itoh, M., Akiyama, S. and Kitahara, A. (1998) ALPORAS, Aluminum foam: Production process, properties and applications, Advanced Engineering Materials, 2000, 2, No. 4, 179-183.
Mosanenzadeh S. G, Naguib H. E., Park C.B, Atalla N., Development, Characterization, and Modeling of Environmentally Friendly Open-Cell Acoustic Foam, Polymer Engineering and Science (2013), vol. 53, Issue 9, 1979-1989.
Sakai et al., Fabrication of Polylactide-Based Biodegradable Thermoset Scaffolds for Tissue Engineering Applications, Macromolecular Materials and Engineering, 2013, 298, 49-52.
Shapovalov, Porous metals. MRS Bulletin, Apr. 1994: 24-28.
Uslu, C., Lee, K.J. Sanders, T.H. and Cochran, J.K. Ti-6AI-4V hollow sphere foams. In Synthesis/Processing of Light Weight Metallic Materials II, (1997) TMS, Warrendale, PA, USA.
Yu, C.-J. Eifert, H., Metal foams, Advanced Materials & Processes, Nov. 1998, 45-47.
Zhang et al., Tailor-made poly(L-lactide)/poly(lactide-co-glycolide)/hydroxyapatite composite scaffolds prepared via high-pressure compression molding-salt leaching, RSC Adv., 2016, 6, pp. 47418-47426.

* cited by examiner a)

b)

c)

OPENLY POROUS ACOUSTIC FOAM, PROCESS FOR MANUFACTURE AND USES THEREOF

CROSS-REFERENCE TO RELATED APPLICATIONS

This application is a National Entry Application of PCT application no PCT/CA2017/051446 filed on Dec. 1, 2017 and published in English under PCT Article 21(2), which itself claims benefit, under 35 U.S.C. § 119(e), of U.S. provisional application Ser. No. 62/426,346, filed on Dec. 2, 2016. All documents above are incorporated herein in their entirety by reference.

FIELD OF THE INVENTION

The invention relates to a process of manufacturing acoustic foams with open porosities made of cured thermosetting resins. The base materials are thermosetting resins, and crystals. This invention further relates to acoustic foams with an open porosity, made of cured thermosetting resins, as well as a use of said openly porous acoustic foams in multiple fields.

BACKGROUND OF THE INVENTION

The presently known techniques for producing foams, mainly metallic foams, can be classified into several categories: liquid (gas injection, foaming agent and eutectic solidification with gas), solid (gas trapping), ionic (electrochemical deposition) or gaseous (evaporation). Metal foams can also be generated by casting (lost-wax casting, casting with low density elements) or by powder (powder compacting or sintering of powder and fibers). Due to the complex and often non-reproducible manufacturing processes, metal acoustic foams currently available on the market are very expensive.

In addition, polymeric foams are known, and they can be made by expanding the polymer with a pressurized gas or using an emulsifying agent. The foams can also be formed by 3D printing or by thermal phase separation. Also known is a technique of dissolving or leaching sodium chloride crystals; said technique is used for shaping thermoplastic polymer foams, in particular PLA and polypropylene.

On another topic, methods of reducing noise levels of aircraft engines are currently known. Current options include a comprehensive review of engine design and the use of Helmholtz resonators. The latter solution is the most widespread treatment and is referred to as localized reaction treatment. However, this type of processing is normally tuned to a frequency band and quickly becomes very cumbersome when attempting to target a wider frequency range. These techniques are also very expensive and the acoustic gain is not always sufficient.

SUMMARY OF THE INVENTION

In accordance with the present invention, there is provided:

1. A method of manufacturing an openly and highly porous thermoset foam, the method comprising the steps of:
   i) mixing a thermosetting resin and crystals to form a mixture;
   ii) applying pressure to the mixture to expel excess thermosetting resin, thereby producing a network of crystals touching each other with the thermosetting resin in the interstices between the crystals of said network;
   iii) curing the thermosetting resin in the mixture under pressure to produce a cured material; and
   iv) contacting the cured material with a solvent for the crystals, thereby leaching the crystals out of the cured material and producing said openly and highly porous thermoset foam.
2. The method according to item 1, wherein the thermosetting resin is a thermosetting plastic resin or a thermosetting elastomer resin, preferably a thermosetting plastic resin.
3. The method according to item 1 or 2, wherein the thermosetting resin is an allyl resin, a bis-maleimides (BMI) resin, a cyanate ester resin, an epoxy resin, a polyester resin, a polyimide resin, a polyurea resin, a polyurethane resin, a silicon resin, a vinyl ester resin, or a saturated or unsaturated rubber, preferably the thermosetting resin is a polyester resin; a vinyl ester resin; an epoxy resin; a polyurethane resin; a silicon rubber or a mixture thereof, and more preferably the thermosetting resin is a vinyl ester resin.
4. The method according to item 3, wherein the epoxy resin is based on epichlorohydrin and bisphenol A.
5. The method according to item 3 or 4, wherein the epoxy resin is D.E.R. 383 Epoxy Resin.
6. The method according to item 3, wherein the epoxy resin is a high modulus epoxy resin.
7. The method according to item 3 or 6, wherein the epoxy resin is Cycom™ PR520.
8. The method according to item 3, wherein the epoxy resin is Sympoxy 1960G.
9. The method according to any one of items 3 to 8, wherein the vinyl ester resin is a bisphenol-A ester vinyl resin.
10. The method according to any one of items 3 to 9, wherein the vinyl ester resin is DERAKANE™ MOMENTUM 411-350.
11. The method according to any one of items 1 to 10, wherein the thermosetting resin is D.E.R. 383 Epoxy Resin, Cycom™ PR520, DERAKANE™ MOMENTUM 411-350, Sympoxy 1960G; or a mixture thereof, preferably the thermosetting resin is DERAKANE™ MOMENTUM 411-350.
12. The method according to any one of items 1 to 11, wherein the crystals are water-soluble and the solvent is water or an aqueous solution.
13. The method according to any one of items 1 to 12, wherein the crystals are salt crystals, sugar crystals, or a mixture thereof.
14. The method according to any one of items 1 to 13, wherein the crystals are salt crystals.
15. The method according to any one of items 1 to 14, wherein the crystals are crystals of sodium chloride (NaCl), magnesium sulphate ($MgSO_4$), copper sulphate ($CuSO_4$), or calcium nitrate ($Ca(NO_3)_2$), or a mixture of said crystals.
16. The method according to any one of items 1 to 15, wherein the crystals are NaCl crystals.
17. The method according to any one of items 1 to 16, wherein the crystals are present in a crystal:thermosetting resin weight ratio of:
    about 75:25, about 80:20, or about 85:15 or more, and/or
    about 95:5, about 90:10, or about 85:15 or less.

18. The method according to any one of items 1 to 17, wherein the mixture has a crystal:thermosetting resin weight ratio between about 80:20 and about 90:10.
19. The method according to any one of items 1 to 18, wherein the mixing is performed using a spiral kneader or mixer whose blades maintain the integrity of the crystals.
20. The method according to any one of items 1 to 19, further comprising adding a liquid or semi-liquid to the mixture before step ii) to lower the viscosity of the thermosetting resin.
21. The method according to item 20, wherein the liquid or semi-liquid solvent is styrene, cyclohexane, petroleum jelly, dichloromethane, ethanol, ethyl acetate, acetone, an isoparaffin oil, or a mixture thereof.
22. The method according to any one of items 1 to 21, further comprising heating the mixture before step ii) to lower the viscosity of the thermosetting resin.
23. The method according to any one of items 1 to 22, wherein the thermosetting resin has a viscosity between about 10 cPa.s and about 1000 cPa.s.
24. The method according to any one of items 1 to 23, wherein the thermosetting resin has a viscosity between about 10 cPa.s to about 500 cPa.s.
25. The method according to any one of items 1 to 24, wherein the applied pressure is
    about 15 MPa, about 20 MPa, about 25 MPa, about 30 MPa, about 35 MPa, about 40 MPa,
    about 45 MPa, about 50 MPa or more, and/or
    about 65 MPa, about 60 MPa, about 55 MPa, about 50 MPa or less.
26. The method according to any one of items 1 to 25, wherein the applied pressure is between about 35 MPa and about 65 Mpa.
27. The method according to any one of items 1 to 26, wherein the applied pressure is between about 60 MPa and about 65 MPa.
28. The method according to any one of items 1 to 27, wherein the excess resin is expelled through channels provided in a mold.
29. The method according to any one of items 1 to 28, wherein the thermosetting resin is a chemically-curable resin and in the curing step, the thermosetting resin is cured by waiting and thus allowing curing to occur.
30. The method according to any one of items 1 to 28, wherein the thermosetting resin is a heat-curable resin and in the curing step, the thermosetting resin is cured by heating the mixture to the curing temperature of the thermosetting resin or above.
31. The method according to any one of items 1 to 28, wherein the thermosetting resin is a radiation-curable resin and in the curing step, the thermosetting resin is cured by exposing the thermosetting resin to curing radiation.
32. The method according to any one of items 1 to 31, wherein steps ii and iii partly overlap.
33. The method according to any one of items 1 to 31, wherein steps ii and iii are carried out consecutively.
34. The method according to any one of items 1 to 33, wherein, in step iv, the cured material is contacted with the solvent for 1 to 4 days.
35. The method according to any one of items 1 to 34, wherein the solvent is water, an aqueous solution or an organic solvent.
36. The method according to any one of items 1 to 35, wherein the solvent with which the cured material is contacted is recirculated.
37. The method according to any one of items 1 to 36, wherein the solvent with which the cured material is contacted is heated.
38. The method according to any one of items 1 to 37, wherein the leaching is carried out under mechanical agitation.
39. The method according to any one of items 1 to 38, wherein more than one type of crystal is used, and wherein the cured material is contacted successively with multiple solvents or contacted with a mixture of solvents.
40. The method according to any one of items 1 to 39, wherein the size of the crystals is:
    about 150, about 200, about 300, about 400, about 500, about 600, about 700, about 800, about 1000 microns or more, and/or
    about 2000, about 1500, about 1250, about 1000, about 900, about 800, about 700, about 600, about 500 microns or less.
41. The method according to any one of items 1 to 40, wherein the size of the crystals is controlled by sieving the crystals before the mixing step.
42. The method according to any one of items 1 to 41, wherein the crystals are spherical, cubic, prismatic or ovoid.
43. The method according to any one of items 1 to 42, wherein crystals of different shapes and/or sizes are used in the same mixture.
44. The method according to any one of items 1 to 43, wherein the method further comprises the step of drying the foam.
45. The method according to item 44, wherein the foam is dried in an oven.
46. The method according to item 44 or 45, wherein the acoustic foam is dried at 60° C.
47. The method according to any one of items 1 to 46, wherein one or more additives are added to the mixture before step ii).
48. The method according to item 47, wherein the one or more additives are nanoparticles.
49. The method according to item 47 or 48, wherein the one or more additives nano clays; nano cellulose; titanium dioxide nanoparticles; and/or carbon nanotubes.
50. The method according to any one of items 1 to 49, wherein step ii) and iii) are carried out while the mixture is in a mold.
51. The method according to any one of items 1 to 50, wherein step iii) comprises;
    iii') completely or at least partially curing the thermosetting resin under pressure to produce an at least partially cured material in which the thermosetting resin has at least reached its gel point,
    iii") producing an additional at least partially cured material by;
    a) placing an additional mixture as defined in any one of items 1 to 55 adjacent to the at least partially cured material;
    b) applying pressure to the additional mixture to expel excess thermosetting resin of the additional mixture, leaving a network of crystals in the additional mixture touching each other with the thermosetting resin of the additional mixture in the interstices of said network;
    c) completely or at least partially curing the thermosetting resin in the additional mixture, under pressure, to produce an additional at least partially cured material in which the thermosetting resin of the additional mixture has at least reached its gel point;

iii''') optionally repeating step iii') one or more times, each additional at least partially cured material produced in each step iii''') being formed adjacent to a previously formed at least partially cured material; and iii'''') if curing was partial in step iii') and step iii'' c), completing curing the thermosetting resin of the mixture and the additional mixture(s).

52. The method according to any one of items 1 to 51, wherein the porosity of the foam is:
    about 70%, about 75%, about 80%, or about 85% or more, and/or
    about 98%, about 95%, about 90%, or about 85% or less.
53. The method according to any one of items 1 to 52, wherein the porosity is between about 75% and about 95%, preferably between about 80% and about 90%.
54. The method according to any one of items 1 to 53, wherein the porosity of the thermoset foam is about 85%.
55. The method according to any one of items 1 to 53, wherein more than about 75% of the pores in the foam are connected to a neighboring pore.
56. The method according to any one of items 1 to 53, wherein more than about 80%, more than about 85%, more than about 90%, more than about 95%, more than about 98%, more than about 99%, or about 100% of the pores in the foam are connected to a neighboring pore.
57. A openly and highly porous thermoset foam made of a thermoset, preferably having a porosity of at least about 70%, and preferably wherein more than about 75% of the pores in the foam are connected to a neighboring pore.
58. The thermoset foam according to item 57, wherein the porosity is:
    about 70%, about 75%, about 80%, or about 85% or more, and/or
    about 95%, about 90%, or about 85% or less.
59. The thermoset foam according to item 57 or 58, wherein the porosity is between about 75% and about 95%, preferably between about 80% and about 90%.
60. The thermoset foam according to any one of items 57 to 59, wherein the porosity is about 85%.
61. The thermoset foam according to any one of items 57 to 60, wherein more than about 80%, more than about 85%, more than about 90%, more than about 95%, more than about 98%, more than about 99%, or about 100% of the pores in the foam are connected to a neighboring pore.
62. The thermoset foam according to item any one of items 57 to 61, having an absorption coefficient of about 0.6 or more over a frequency range of about 1000 (or about 1500) to about 6500 Hz.
63. The thermoset foam according to any one of items 57 to 62, having a normalized resistance of about 5 or less.
64. The thermoset foam according to any one of items 57 to 63, being an acoustic foam.
65. The thermoset foam according to any one of items 57 to 64, having a compression modulus of about 8 MPa or more.
66. The thermoset foam according to any one of items 57 to 65, wherein said thermoset foam is integrated into a composite material.
67. The thermoset foam according to any one of items 57 to 66, wherein the thermoset foam is integrated into a composite sandwich structure.
68. The thermoset foam according to any one of items 57 to 67, wherein the size of the pores is:
    about 150, about 200, about 300, about 400, about 500, about 600, about 700, about 800, about 1000 microns or more, and/or
    about 2000, about 1500, about 1250, about 1000, about 900, about 800, about 700, about 600, about 500 microns or less.
69. The thermoset foam according to any one of items 57 to 68, wherein the pores are spherical, cubic, prismatic, or ovoid.
70. The thermoset foam according to any one of items 57 to 69, wherein pores of different shapes and/or sizes are present in a single thermoset foam.
71. The thermoset foam according to any one of items 57 to 70, wherein the thermoset foam contains gradients or variations with regards to nature of the thermoset, pore size, pore shape, porosity and/or optional additives.
72. The thermoset foam according to any one of items 57 to 71, wherein the thermoset foam contains is uniform with regards to nature of the thermoset, pore size, pore shape, porosity and/or optional additives.
73. The thermoset foam according to any one of items 57 to 72, wherein the thermoset foam is in the form of a panel.
74. The thermoset foam according to item 73, wherein said panel is flat, curved, any complex shape, or any irregular shape.
75. The thermoset foam according to item 73 or 74, wherein said panel has a raised pattern on one or both faces.
76. The thermoset foam according to any one of items 57 to 72, wherein the thermoset foam is in the form of a shell.
77. The thermoset foam according to item 76, wherein said shell is open or closed.
78. The thermoset foam according to any one of items 57 to 77, wherein is obtained from a thermosetting resin as defined in any one of items 2 to 11.
79. The thermoset foam according to any one of items 57 to 78, being manufactured according to the method described in any one of items 1 to 56.
80. The method according to any one of items 1 to 56, wherein the thermoset foam is as defined in any one of items 57 to 78.
81. Use of the thermoset foam according to any one of items 57 to 79 as an acoustic foam.
82. Use of the thermoset foam according to any one of items 57 to 79 as a sound absorbing material.
83. Use of the thermoset foam according to any one of items 57 to 79 for attenuating airborne sound waves.
84. Use of the thermoset foam according to any one of items 57 to 79 for controlling or reduce noise level, vibration, and/or echoes.
85. Use of the thermoset foam according to any one of items 57 to 79 as a component of an assembly.
86. Use of the thermoset foam according to any one of items 57 to 79 to replace a pre-existing component of an assembly by a similar component made of the thermoset foam.
87. The use according to item 85 or 86, wherein the thermoset foam is a structural component of the assembly.

88. The use according to any one of items 85 to 87, wherein the thermoset foam reduces noise, vibration and/or echoes within the assembly or without the assembly.
89. The use according to any one of items 81 to 88, wherein the thermoset foam bears a load.
90. The use according to any one of items 81 to 89, wherein the thermoset foam is under pressure.
91. A component of an assembly comprising, or consisting of, the thermoset foam of any one of items 57 to 79.
92. The component according to item 91 being a structural component of the assembly.

BRIEF DESCRIPTION OF THE DRAWINGS

In the appended drawings:
FIG. 3(a) shows crystals and a thermosetting resin in a proper weight ratio;
FIG. 3(b) shows a mixing of the crystals and resin;
FIG. 3(c) shows a mixture of the crystals and resin;
FIG. 3(d) shows molding of the crystal/resin mixture;
FIG. 3(e) shows compaction and curing of the crystal/resin mixture;
FIG. 3(f) shows demolding after curing of the cured mixture;
FIG. 3(g) shows the cured crystal/resin mixture before leaching;
FIG. 3(h) shows a thermoset foam after leaching and drying.

DETAILED DESCRIPTION OF THE INVENTION

Figure 1:
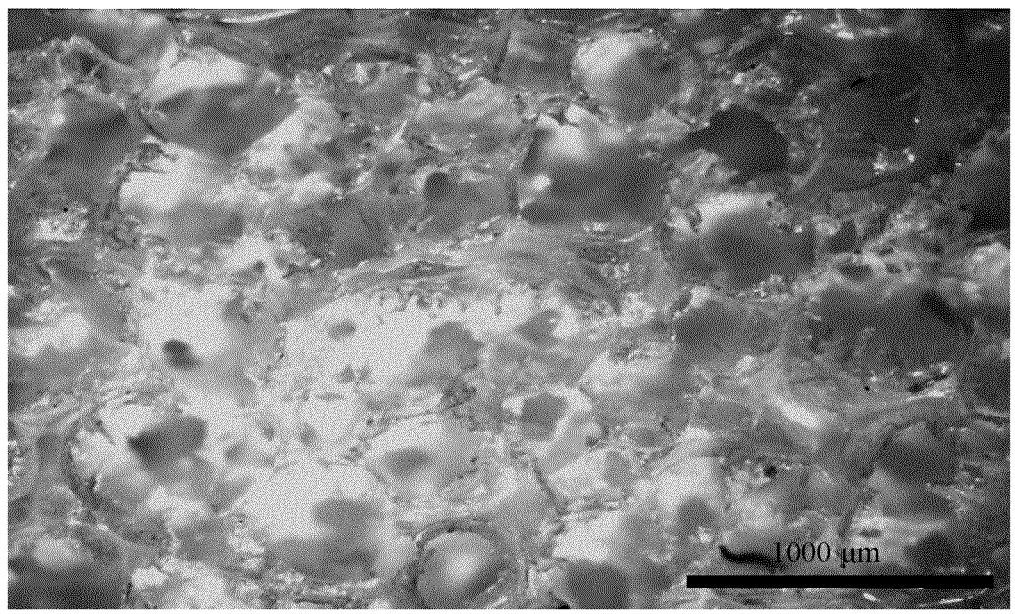
FIG. 1 shows a thermoset foam made using DER383.

The present invention relates to an openly and highly porous thermoset foam, together with its method of manufacture and uses, notably as an acoustic foam and/or structural element in various applications.

Method of Manufacturing an Openly Porous Foam

Turning now to the invention in more details, there is provided a method of manufacturing an openly and highly porous thermoset foam, the method comprising the steps of:
i. mixing a thermosetting resin and crystals to form a mixture;
ii. applying pressure to the mixture to expel excess thermosetting resin, thereby producing a network of crystals touching each other with the thermosetting resin in the interstices between the crystals of said network;
iii. curing the thermosetting resin in the mixture under pressure to produce a cured material; and
iv. contacting the cured material with a solvent for the crystals, thereby leaching the crystals out of the cured material, thereby obtaining said openly and highly porous thermoset foam.

Herein, a "thermosetting resin" is a solid powder or viscous liquid monomer or prepolymer that changes irreversibly into an infusible, insoluble polymer network by curing via the application of heat for heat-curable thermosetting resins or radiation (typically UV) for radiation-curable resins, or via the action of a curing agent (catalyst, hardener, etc.) for chemically-curable thermosetting resins. The curing of a thermosetting resin produces a cured thermosetting resin called herein a "thermoset". The cure of a thermosetting resin typically involves crosslinking or chain extension through the formation of covalent bonds between individual chains of the polymer.

There are two main classes of thermosets, which are both encompassed with the present invention: thermoset plastics, obtained from resins herein called "thermosetting plastic resins" and thermoset elastomers, obtained from resins herein called "thermosetting elastomer resins". Thermoset plastics are generally characterized by rigid, three-dimensional structures and high molecular weights; they stay out of shape when deformed and undergo permanent or plastic deformation under load, and normally decompose when heated instead of melting. Thermoset elastomers, are generally soft and springy or rubbery, can be deformed and revert to their original shape on loading release, and also normally decompose when heated instead of melting. The cure of thermoset elastomers is typically called "vulcanization" for historical reasons. The cure of thermoset elastomers can involve sulfur ("sulfur vulcanization") or other curing agents ("non-sulfur vulcanization").

As will be apparent from the above, conventional thermoset plastics or elastomers therefore cannot be melted and re-shaped after they have been cured. This is in contrast with thermoplastics, which are commonly produced in pellets, and shaped into their final product form, and reshaped as needed, by melting and pressing or injection molding.

Since the material produced by the present method is made of a thermoset (via curing of a thermosetting resin), including thermoset plastics and thermoset elastomers, preferably a thermoset plastic, and is openly and highly porous, it is referred to herein as a "thermoset foam".

The method of the present invention is compatible with a large variety of thermosetting resins, including those producing thermoset plastics and thermoset elastomers, preferably a thermoset plastic. The thermosetting resin should be selected based on mechanical properties desired for the foam and especially based on ease of implementation (including its formulation and polymerization). If the foam is to be used as a structural component in a given application, the resin once cured should have a sufficient modulus or mechanical resistance in the conditions in which the foam will be used.

Thermosetting resins are well-known to the skilled person and widely available commercially. Thermosetting resins are typically sold with instructions for their use or such instructions are otherwise available to the skilled person. For example, the curing temperature and conditions of heat-curable thermosetting resins is typically widely available. Also, the compatible curing agent(s) and the curing conditions of chemically-curable thermosetting resins are also widely known. In fact, for ease of use, many chemically-curable thermosetting resins are sold within a kit containing the required curing agent(s). Thermosetting resins are also often commercially available pre-formulated as mixtures containing one or more thermosetting resins, one or more hardeners, curing agents, accelerators, etc.

In embodiments, the thermosetting resin is mono component. In other embodiments, the thermosetting resin is bi-component.

In embodiments, the thermosetting resin is pre-formulated. In other embodiments, the thermosetting resin is not pre-formulated.

As noted above, the thermosetting resin may be a solid powder or viscous liquid. In embodiments, the thermosetting resin is a viscous liquid. In other embodiments, the thermosetting resin is a solid powder.

Thermoset plastic resins encompassed within the invention include:

| Thermoset Plastic Resins |
|---|
| Allyl resins |
| Thermosetting transparent abrasion-resistant synthetic resins or plastics made usually from esters derived from allyl alcohol or allyl chloride |
| Bis-maleimides (BMI) resins |
| Formed by the condensation reaction of a diamine with maleic anhydride, and processed basically like epoxy resins (350° F. (177° C.) cure). |
| Cyanate ester resins |
| The reaction of bisphenols or multifunctional phenol novolac resins with cyanogen bromide or chloride leads to cyanate functional monomers which can be converted in a controlled manner into cyanate ester functional prepolymer resins by chain extension or copolymerization. |
| Epoxy resins (also called epoxides) |
| Epoxy resins are thermosetting prepolymers made either by the reaction of epichlorohydrin with hydroxyl functional aromatics, cycloaliphatics and aliphatics or amine functional aromatics, or by the oxidation of unsaturated cycloaliphatics. Epoxide functional resins and prepolymers cure by polyaddition/copolymerisation or homopolymerisation depending on the selection of crosslinker, hardener, curing agent or catalyst as well as by the temperature. |
| Polyester resins |
| Unsaturated polyester resins are an extremely versatile, and fairly inexpensive class of thermosetting polymer formed by the polycondensation of glycol mixtures containing propylene glycol, with a dibasic acid and anhydrides usually maleic anhydride to provide backbone unsaturation needed for crosslinking, and orthophthalic anhydride, isophthalic acid or terephthalic acid where superior structural and corrosion resistance properties are required. Polyester resins are routinely diluted/dissolved in a vinyl functional monomer such as styrene and include an inhibitor to stabilize the resin for storage purposes. Polymerisation in service is initiated by free radicals generated from ionizing radiation or by the photolytic or thermal decomposition of a radical initiator. Organic peroxides, such as methyl ethyl ketone peroxide and auxiliary accelerators which promote decomposition to form radicals are combined with the resin to initiate a room temperature cure. |
| Polyimide resins |
| Thermosetting cross-linkable polyimides made by the condensation of aromatic diamines with aromatic dianhydride derivatives and anhydrides with unsaturated sites that facilitate addition polymerisation between preformed imide monomers and oligomers. Thermoset polyimides are the most advanced of all thermoset polymer matrices with characteristics of high temperature physical and mechanical properties and are available commercially as resin, prepreg, stock shapes, thin sheets/films, laminates, and machined parts. Along with the high temperature properties, this thermoset polymer type must be processed at very high temperatures and relative pressure to produce optimum characteristics. |
| Polyurea resins |
| Thermoset elastomeric polymers with carbamide (—NH—CO—NH—) links made by combining diisocyanate monomers or prepolymers with blends of long-chain amine-terminated polyether or polyester resins and short-chain diamine extenders. |
| Polyurethane resins |
| Thermoset polyurethane prepolymers with carbamate links are linear and elastomeric is formed by combining diisocyanates with long chain diols, or crosslinked and rigid if formed from combinations of polyisocyanates and polyols. |
| Silicone resins |
| Silicone resins are partly organic in nature with a backbone polymer structure made of alternating silicon and oxygen atoms rather than the familiar carbon-to-carbon backbone characteristics of organic polymers. In addition to having at least one oxygen atom bonded to each silicone atom, silicone resins have direct bonds to carbon and therefore also known as polyorganosiloxanes. They have the general formula $(R_2SiO)_n$, and the physical form (liquid, gel, elastomer or solid) and use varies with molecular weight, structure (linear, branched, caged) and nature of substituent groups (R = alkyl, aryl, H, OH, alkoxy). Aryl substituted silicone resins have greater thermal stability than alkyl substituted silicone resins when polymerised (condensation cure mechanism) at temperatures between~300° F. (~150° C) and~400° F (~200° C). Heating above~600° F (~300° C) converts all silicone polymers into ceramics since all organic constituents pyrolytically decompose leaving crystalline silicate polymers |

| Thermoset Plastic Resins |
|---|
| with the general formula (—SiO$_2$—)$_n$. In addition to applications as ceramic matrix composite precursors, silicone resins in the form of polysiloxane polymers made from silicone resins with pendant acrylate, vinyl ether or epoxy functionality find application as UV, electron beam and thermoset polymer matrix composites where they are characterised by their resistance to oxidation, heat and ultraviolet degradation. |
| Vinyl esters resins |
| Vinyl ester resins made by addition reactions between an epoxy resin with derivatives of acrylic acid such as methacrylic acid, when diluted/dissolved in a vinyl functional monomer such as styrene, polymerise like unsaturated polyester resins. The resulting thermosets are notable for their high adhesion, heat resistance and corrosion resistance, and are stronger than polyesters and more resistant to impact than epoxies. |

Thermoset elastomer resins include unsaturated rubbers that can typically be cured by sulfur or non-sulfur vulcanization and saturated rubbers which cannot typically be cured by sulfur vulcanization. Non-limiting examples of unsaturated rubbers include:
  Natural polyisoprene: cis-1,4-polyisoprene natural rubber (NR) and trans-1,4-polyisoprene gutta-percha,
  Synthetic polyisoprene (IR for isoprene rubber),
  Polybutadiene (BR for butadiene rubber),
  Chloroprene rubber (CR), polychloroprene, Neoprene, Baypren etc.,
  Butyl rubber (copolymer of isobutylene and isoprene, IIR),
  Halogenated butyl rubbers (chloro butyl rubber: CIIR; bromo butyl rubber: BIIR),
  Styrene-butadiene Rubber (copolymer of styrene and butadiene, SBR),
  Nitrile rubber (copolymer of butadiene and acrylonitrile, NBR), also called Buna N rubbers, and
  Hydrogenated Nitrile Rubbers (HNBR) Therban and Zetpol.
Non-limiting examples of saturated rubbers include:
  EPM (ethylene propylene rubber, a copolymer of ethylene and propylene) and EPDM rubber (ethylene propylene diene rubber, a terpolymer of ethylene, propylene and a diene-component),
  Epichlorohydrin rubber (ECO),
  Polyacrylic rubber (ACM, ABR),
  Silicone rubber (SI, Q, VMQ),
  Fluorosilicone Rubber (FVMQ),
  Fluoroelastomers (FKM and FEPM) Viton, Tecnoflon, Fluorel, Aflas and Dai-El,
  Perfluoroelastomers (FFKM) Tecnoflon PFR, Kalrez, Chemraz, Perlast,
  Polyether block amides (PEBA),
  Chlorosulfonated polyethylene (CSM), (Hypalon), and
  Ethylene-vinyl acetate (EVA).

Preferred vinyl ester resins include bisphenol-A ester vinyl resin, such as DERAKANE™ MOMENTUM 411-350. Preferred epoxy resins include Sympoxy 1960G, resins based on epichlorohydrin and bisphenol A such as D.E.R. 383 Epoxy Resin, as well as high modulus epoxy resins, such as Cycom™ PR520. Preferred saturated rubbers include Silicone rubber such as Dow Corning 3145 RTV.

In embodiments, the thermosetting resin is a polyester resin, a vinyl ester resin, an epoxy resin, a polyurethane resin, or a silicon resin. In preferred embodiments, the thermosetting resin is D.E.R. 383 Epoxy Resin, Cycom™ PR520, DERAKANE™ MOMENTUM 411-350, Sympoxy 1960G, or Dow Corning 3145 RTV.

In more preferred embodiments, the thermosetting resin is a vinyl ester resin, preferably a bisphenol-A ester vinyl resin, most preferably DERAKANE™ MOMENTUM 411-35.

In embodiments, a mixture of the above resins can be used.

The method of the present invention is also compatible with a large variety of crystals and solvents. The crystals are solid crystalline material whose constituents (such as atoms, molecules or ions) are arranged in a highly ordered microscopic structure, forming a crystal lattice that extends in all directions.

The crystals and solvent are chosen so that the crystals are soluble in the solvent, and the crystals and solvent do not react with the thermosetting resin (before and after curing).

In embodiments, the crystals are water-soluble and the solvent is water or an aqueous solution.

In preferred embodiments, the crystals are salt crystals, sugar crystals, or a mixture thereof. In a more preferred embodiment, the crystals are salt crystals.

In an even more preferred embodiment, the salt crystals are crystals of sodium chloride (NaCl), magnesium sulphate (MgSO$_4$), copper sulphate (CuSO$_4$), or calcium nitrate (Ca(NO$_3$)$_2$), or a mixture of these crystals. In a most preferred embodiment, the salt crystals are NaCl, due to its low cost, ease of supply and the variety of crystal sizes available.

In embodiments, a mixture of the above crystals can be used.

The porosity of the foam produced will depend on the crystal:resin weight ratio of the mixture and on the pressure applied for curing.

For certainty, the crystal:resin weight ratio is expressed as follows: crystal:resin weight ratio=weight of crystals:weight of thermosetting resin. A ratio of 80:20 thus means that the mixture comprises 80 wt. % of crystals and 20 wt. % of thermosetting resin, both percentages being based on the total weight of the crystals and thermosetting resin (i.e. excluding the weight of any potential additives). The weight ratio will depend on the chosen thermosetting resin and crystals. In general, the crystal:resin weight ratio is such that the mixture obtained in step i) comprises crystals that are in contact with each other or separated only by a small amount of the resin. In embodiments, the mixture has a crystal:resin weight ratio between about 80:20 and about 90:10 In preferred embodiments of the present invention, the crystals are present in a crystal:thermosetting resin weight ratio of:
  about 75:25, about 80:20, or about 85:15 or more, and/or
  about 95:5, about 90:10, or about 85:15 or less.

The thermosetting resin and crystals can be mixed by any means known to the skilled person. Preferably, the mixing is performed using a spiral kneader or mixer whose blades does not compromise the integrity of the crystals. The resulting mixture will comprise crystals that are in contact with each other and/or separated by resin, with the resin also occupying interstices between the crystals.

As previously mentioned, the thermosetting resin may be a solid powder or a viscous liquid. In the case of a powdered resin, the resin particles should be sufficiently small to fill the interstices within the network of compacted crystals. The solid powder should also be meltable into a viscous liquid at a temperature below its curing temperature.

Whether the viscous liquid is obtained at room obtained or by melting the solid powder, its viscosity may ideally vary from about 10 cPa.s to about 1000 cPa.s, preferably between about 10 cPa.s to about 500 cPa.s. Indeed, resins with very high viscosities, for example some elastomer resins, may be more difficult to mix with the crystals and/or to expel by the application of pressure. Furthermore, the resin viscosity and wettability generally affects the morphology of the interconnection between the pores, leading to more or less resistive foams. Therefore, these parameters can be changed to tailor the foam as desired. These parameters can be changed notably by changing the resin, increasing the temperature of the resin (or crystal/resin mixture), and/or by adding a solvent to the resin (or crystal/resin mixture). Therefore, in further embodiments of the present invention, a liquid or semi-liquid is added to the mixture in order to decrease the viscosity of the thermosetting resin. In other embodiments, the mixture is heated before step ii) in order to decrease the viscosity of the thermosetting resin. This can be used with viscous or solid thermosetting resins to make the crystal/resin mixture more homogeneous, which can help control the rate of polymerization during the curing step. The control of the viscosity and of the rate of polymerization also makes it possible to avoid the formation of variation or alternatively to produce of a gradient (either a continuous gradient or a step gradient) of the pores in the foam. When heating in these circumstances, it is possible that the increase in temperature will start or speed resin curing. This is not problematic as long as care is taken to apply pressure to the mixture to expel excess thermosetting resin as per step ii) when the resin has an appropriate viscosity and before it cures into a solid thermoset.

The liquid or semi-liquid can be any liquid or semi-liquid that will not react with the thermosetting resin or the crystals. In embodiments, the liquid is a solvent for the resin. In other embodiments, the liquid is not a solvent for the resin. In preferred embodiments, the solvent is styrene, cyclohexane, petroleum jelly (a semi-solid), dichloromethane (DCM), ethanol, ethyl acetate, acetone, an isoparaffin oil, or a mixture thereof.

The next step is to apply pressure to the mixture. The applied pressure evacuates excess resin that is between crystals, thereby ensuring contact between the crystals and that the final product will have a high open porosity. More specifically, when pressure is applied, some of the thermosetting resin will be expelled from in-between the crystals and thus will leave behind a network of crystals touching each other with thermosetting resin in the interstices between the crystals of the network. Consequently, the applied pressure will affect the level of open porosity of the foam produced. Higher pressures expel more resin and increase contacts between crystals and thus tend to ensure more open porosity. Accordingly, the applied pressure can be adjusted to maintain the level of contact between the crystals, thereby allowing the desired level of open porosity to be obtained. The pressure should not be so high that the crystals are crushed. In embodiments, the applied pressure is
about 15 MPa, about 20 MPa, about 25 MPa, about 30 MPa, about 35 MPa, about 40 MPa, about 45 MPa, or about 50 MPa or more, and/or
about 65 MPa, about 60 MPa, about 55 MPa, or about 50 MPa or less.

Preferably, the applied pressure is between about 35 MPa and about 65 MPa, and more preferably it is between about 60 MPa and about 65 MPa.

It will be apparent to the skilled person that this resin expulsion requires that the resin be able to flow out of the mixture when pressured is applied. For liquid resins of lower viscosities simply applying pressure will be sufficient to achieve that goal. For more viscous liquid resins and powdered resins, it will be necessary, as noted above, to heat the mixture until the resin is a liquid of sufficiently low viscosity that it can flow out when pressure is applied.

In embodiments, steps ii) and iii) are carried out with the mixture in a mold. Before putting the mixture in the mold, the walls of the mold may be treated with a release agent that will ease eventual demolding. Non-limiting examples of release agents include sont Chemlease™ 70-90EZ, Frekote™ 700NC, Frekote™ 710LV, ou encore MCLUBE™ 1711L.

In order to expel excess resin when pressure is applied, a mold provided with channels through which the excess resin can flow out can conveniently be used.

It will be apparent to the skilled person that since resin has been expelled, the crystal:thermosetting resin weight ratio present in the material after this step (herein after the "final crystal:thermosetting resin weight ratio") is different from the crystal:thermosetting resin weight ratio in the mixture before pressure is applied (herein the "original crystal:thermosetting resin weight ratio"). In fact, the final ratio is mostly independent from the original ratio, and rather depends on the size of the crystals, the pressure applied, the viscosity of the thermoset resin, etc.

The next step is to cure the thermosetting resin in the mixture under pressure. Indeed, the pressure must be maintained while curing so that the product after curing comprises the desired network of crystals touching each other with thermoset (i.e. cured thermosetting resin) in the interstices of said network.

The curing of the thermosetting resin can be accomplished by any method known to the skilled person. The curing method will depend on the nature of the thermosetting resin. For self-curable resins (e.g. chemically-curable resins), it is sufficient to wait thereby allowing the curing to occur. Heat-curable resins will be cured via exposition to heat, while radiation-curable resins will be cured via exposition to the appropriate radiation suitable (often UV radiation). Certain heat-curable resins can also be cured at room temperature or lower; exposing such resins to higher heats is not necessary, although it can accelerate the curing process. Also, the exposition to heat or radiation should last the time prescribed for the resin and the amount of heat/radiation used.

In embodiments, in the curing step, the thermosetting resin is cured by heating the mixture to the cure temperature of the thermosetting resin or above; or by exposing the thermosetting resin to curing radiation. In preferred embodiments, the thermosetting resin is cured by heating the mixture to the cure temperature of the thermosetting resin or above.

Steps ii and iii can be carried out partly overlapped. In fact, when heat is necessary to melt the resin and/or lower the viscosity of the resin, so it can be expelled, and the resin is heat-curable, it might in fact be impossible to carry out these steps completely separately. It might also be impossible to carry out these steps completely separately if the resin can be cured at room temperature or lower. In such cases, the curing begins when or before pressure is applied. Of course, steps ii and iii cannot completely overlap. Indeed, pressure must be applied to the mixture to expel excess thermosetting resin as per step ii) when the resin has an appropriate viscosity and before it cures into a solid thermoset, which is achieved at the end of step iii).

The next step is to leach the crystals out of the cured material using a solvent.

When the resin has been cured in a mold, the resin is preferably removed from the mold before leaching.

Leaching is achieved by contacting the cured material with a solvent for the crystals. This solvent should dissolve the crystals, while not reacting with the thermosetting resin (and any additives that may be present). The cured material should be contacted with the solvent for sufficient time to dissolve as many crystals as possible, thereby producing the highly and openly porous thermoset foam. Typically, depending on the thickness of the cured material, leaching can last from 1 to 4 days. Leaching time will also depend on the size of the interconnections between the pores; smaller interconnection impeding solvent flow and decreasing leaching rate. Thicker cured materials generally require more leaching time. The cured material should be completely immersed in the solvent, and the solvent in which the cured material is immersed is preferably recirculated to ensure it does not become saturated with crystals. To accelerate leaching, mechanical agitation with a magnetic bar or in an ultrasonic bath (where there is no impact on the resin) and/or heating, which increases solubility of the crystals in the solvent, can be used. The solvent for the crystals will be chosen according to the nature of the crystals and the resin. In embodiments, the solvent is water, an aqueous solution (e.g. soapy water, acidic aqueous solution (comprising for example sulfuric acid, preferably at low concentration), or an organic solvent (e.g. alcohols such as ethanol, dichloromethane, an oil, a paraffin oil, etc.) In preferred embodiments, the solvent is water or an aqueous solution.

It will be apparent to the skilled person that the leaching of the salt will leave behind a porosity that is mostly open. Indeed, crystals that would not be connected to other would not be leached out as the solvent would not reach them. Thus, the pores created by leaching of the crystals will be connected to each other, yielding a mostly open porosity.

If more than one type of crystal is used, the cured material may be contacted successively with multiple solvents or contacted with a mixture of solvents to dissolve each type of crystal. In preferred embodiments, the solvent is heated to facilitate the dissolution of the crystals.

In embodiments, the contacting step may be conveniently carried out in a bath of the solvent. In embodiments, the bath can be temperature controlled.

The dissolution of the crystals leaves behind corresponding tunnels and cavities in the thermoset foam. As a network of crystals touching each other with thermosetting resin in the interstices of said network existed in thermoset material before leaching, the thermoset foam (producing by leaching the crystals out of the thermoset) comprises a network of connected pores. In other words, the produced thermoset foam is highly and openly porous.

Indeed, herein, an "open porosity" is a porosity wherein pores connect with each other. More specifically, an "openly" porous foam includes, for example, a foam in which more than about 75% of the pores are connected to a neighboring pore. In preferred embodiments, more than about 80%, more than about 85%, more than about 90%, more than about 95%, more than about 98%, more than about 99%, or about 100% of the pores are connected to a neighboring pore.

Herein, a "highly porous" foam is a foam with a porosity of at least about 70%. In embodiments of the present invention, the porosity of the foam is:
about 70%, about 75%, about 80%, about 85%, about 90%, about 95% or more, and/or
about 98%, about 95%, about 90%, about 85% or less.
Preferably, the porosity of the foam is between about 75% and about 95%. In more preferred embodiments, the porosity of the thermoset foam is between about 80% and about 90%. In a most preferred embodiment, the porosity of the thermoset foam is about 85%.

Figure 3:
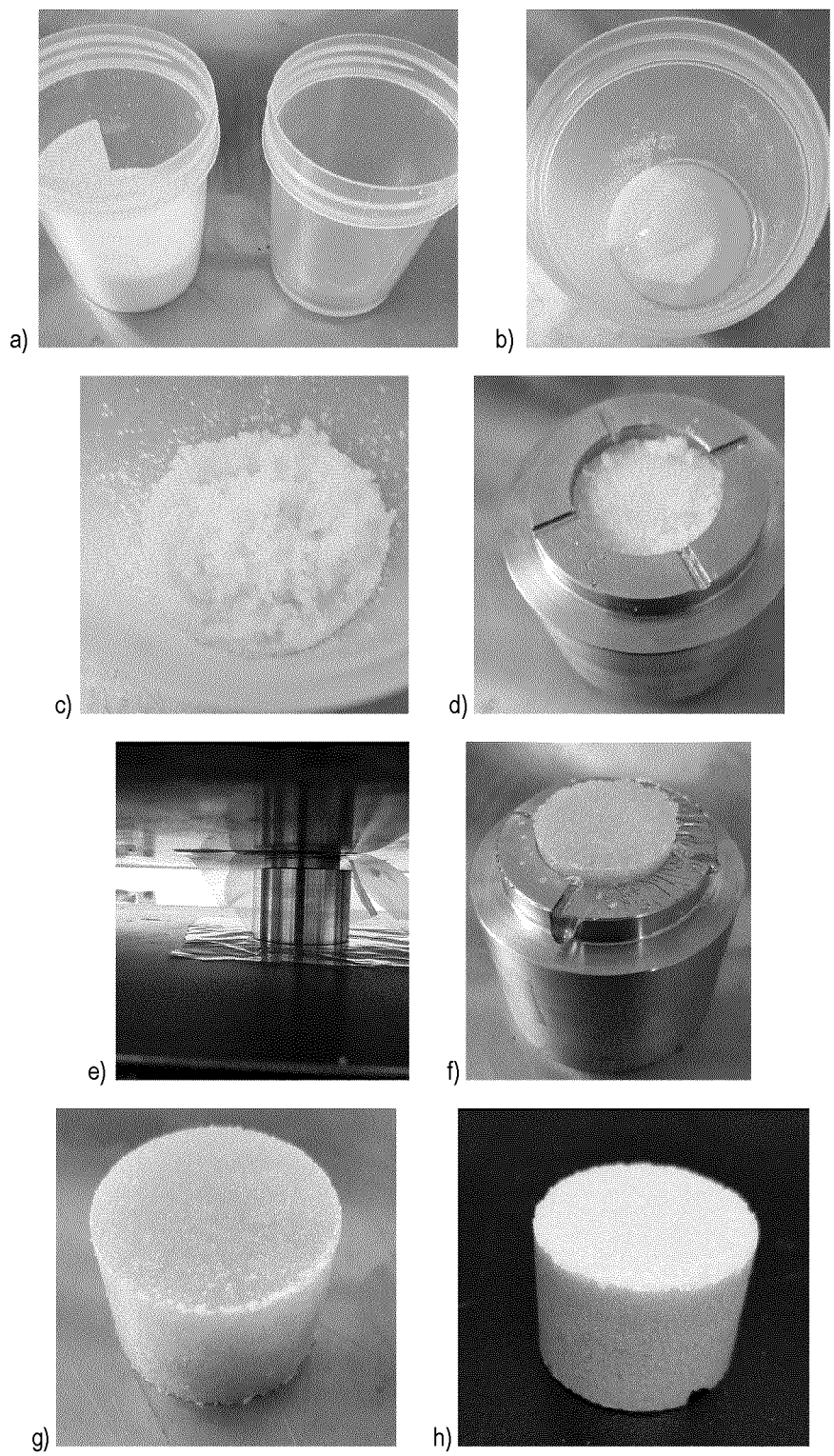
FIG. 3 shows a process of making a thermoset foam.

FIG. 3 illustrates a process of the present invention. Specifically, FIG. 3(a) shows crystals and a thermosetting resin in a proper weight ratio; FIG. 3(b) shows a mixing of the crystals and resin; FIG. 3(c) shows a mixture of the crystals and resin; FIG. 3(d) shows molding of the crystal/resin mixture; FIG. 3(e) shows compaction and curing of the crystal/resin mixture; FIG. 3(f) shows demolding after curing of the cured mixture; FIG. 3(g) shows the cured crystal/resin mixture before leaching; and FIG. 3(h) shows a thermoset foam after leaching and drying.

The pores reflect the imprint left by the crystals after leaching. Thus, the size and shape of the pores in the thermoset foam are roughly the same as the size and shape of the crystals. It will thus be apparent to the skilled person that the characteristics of pores in the produced thermoset foam can be tailored by changing the characteristics of the crystals used in the present method.

The size of the pores in the thermoset foam depends on the size of the crystals. In embodiments, the size of the crystals is:
about 150, about 200, about 300, about 400, about 500, about 600, about 700, about 800, about 1000 microns or more, and/or
about 2000, about 1500, about 1250, about 1000, about 900, about 800, about 700, about 600 or about 500 microns or less.

The size of the crystals can be controlled by sieving the crystals before the mixing step.

The crystals can be of any shape. In embodiments, the crystals are spherical, cubic, prismatic or ovoid. The size and shape of the crystals, as well as the applied pressure, will generally determine the ratio of cured thermosetting resin with respect to crystals remaining in the material.

In embodiments, crystals of different shapes and/or sizes may be used in the same mixture. This allows pores of various shapes and sizes to be formed. The shape of the pore may have an impact on the mechanical properties of the foam. Generally speaking, relatively better mechanical properties can be obtained with salts that are rounder.

Optionally, in embodiments, the method of the invention further comprises the step of drying the foam. The drying of the foam can be accomplished by any method that will preserve the properties of the thermoset foam known to the skilled person. In preferred embodiments, the thermoset foam is dried in an oven. In a more preferred embodiment, the thermoset foam is dried in an oven, with forced convection as needed, for example at 60 degrees Celsius.

In further embodiments, additives are added to the mixture before step ii). Additives can add additional functionality to the foam. In preferred embodiments, these additives are nanoparticles that are incorporated into the mixture before curing. In more preferred embodiments, the additives are
ceramic nanoparticles,
metal nanoparticles,
carbon fibers,
glass fibers or glass microspheres, nano clays, which tend to improve the flame retardancy and mechanical properties of the foam;

nano cellulose, which tends to improve the mechanical properties of the foam, as well as its barrier properties, especially for gases;

titanium dioxide nanoparticles, which reacts to ultraviolet rays (photocatalytic effect), thereby making it possible to make repairs on site; and carbon nanotubes, which tend to improve mechanical properties, as well as electrical and thermal conductivity of the foam.

The method of the invention may also be used to produce a composite of multiple thermoset foams according to the invention, said foams being adjacent to each other. For example, the various foams may be produced from different thermosetting resin/crystal mixtures allowing creating materials with gradients (either continuous gradients or step gradients) or variations with regards to the nature of thermoset, pore size, pore shape, porosity and/or optional additives. In preferred, embodiments, such material is bi- or multi-layered, the various foams being arranged in a stack.

Typically, the above composites are created during or after step iii), i.e. after some curing has occurred or after curing is complete. More specifically, in embodiments, step iii) comprises the step iii') of completely or at least partially curing the thermosetting resin under pressure to produce an at least partially cured material in which the thermosetting resin has at least reached its gel point. In this step, the curing is either complete or partial (with a minimum curing defined by the thermosetting resin having reached its gel point).

Then, step iii) comprises step iii''') in which an additional at least partially cured material is produced. First, an additional mixture as defined above is placed adjacent to the at least partially cured material that has already been produced. Then, pressure is applied to this mixture and the thermosetting resin therein is then completely or partially cured (with the same minimum curing as above). This step produces an additional at least partially cured material that is adjacent to the previously formed at least partially cured material.

Then, step iii) comprises step iii''') in which step iii'') are optionally repeated one or more times. Each time step iii'') is repeated, an additional at least partially cured material is formed adjacent to a previously formed at least partially cured material. When a multilayered composite is required, each additional at least partially cured material will typically be produced on top of the latest at least partially cured material formed.

Finally, step iii) comprises the completion of the curing of the thermosetting resin of the mixture and any additional mixture(s) used to make additional at least partially cured material. This step is optionally in the sense that it only applies when the curing was not completed in step iii') or step iii''. If the curing was complete in these steps, there is no need to further cure the resin.

The resulting material can then be leached as described above.

It should be understood that the foam can be produced by itself, i.e. as a stand-alone product, or that it can be produced on a substrate. In such case, the mixture is deposited on a substrate before steps ii) and iii).

In embodiments, the foam produced by the above method is as described in the next section.

Openly and Highly Porous Thermoset Foam

In another aspect, the present invention provides an openly and highly porous thermoset foam.

In embodiments, the thermoset foam is manufactured according to the method described in the previous section.

Herein, a "thermoset foam" is a porous material made of a thermoset, including thermoset plastics and thermoset elastomers, preferably a thermoset plastic. As noted above, such thermoset is obtained by curing thermosetting resin. In embodiments, the thermoset is obtained by curing the thermosetting resin described in the previous section, including preferred embodiments thereof.

As noted above, an "open porosity" is a porosity wherein pores connect with each other. Herein, an "openly" porous foam includes, for example, a foam in which more than about 75% of the pores are connected to a neighboring pore. In preferred embodiments, more than about 80%, more than about 85%, more than about 90%, more than about 95%, more than about 98%, more than about 99%, or about 100% of the pores are connected to a neighboring pore.

As noted above, herein, a "highly porous" foam is a foam with a porosity of at least about 70%. In embodiments of the present invention, the porosity of the foam is:

about 70%, about 75%, about 80%, about 85%, about 90%, about 95% or more, and/or about 98%, about 95%, about 90%, about 85% or less.

Preferably, the porosity is between about 75% and about 95%. In more preferred embodiments, the porosity of the thermoset foam is between about 80% and about 90%. In a most preferred embodiment, the porosity of the thermoset foam is about 85%.

In embodiments, the size of the pores of the foam is:

about 150, about 200, about 300, about 400, about 500, about 600, about 700, about 800, about 1000 microns or more, and/or about 2000, about 1500, about 1250, about 1000, about 900, about 800, about 700, about 600 or about 500 microns or less.

The pores can be of any shape. In embodiments, the pores are spherical, cubic, prismatic, or ovoid.

In embodiments, pores of different shapes and/or sizes are present in a single thermoset foam.

In embodiments, the thermoset comprises one or more additives. The additives being as described in the previous section.

In additional embodiments, the thermoset foam may contain gradients or variations with regards to the nature of thermoset, pore size, pore shape, porosity and/or optional additives. Such gradient can be a continuous gradient (i.e. a gradient in which a property varies in a continuous fashion) or (i.e. a gradient in which a property varies in a series of discrete steps).

In other embodiments, the thermoset foam is uniform with regard to the nature of thermoset, pore size, pore shape, porosity and/or optional additives.

The thermoset foam can be of any shape. In embodiments, the thermoset foam is in the form of a panel. This panel may be flat, curved, any complex shape, or any irregular shape, and it may have a raised pattern on one or both faces of the panel. Said raised pattern may be any 3D shape, including pyramids, waves, bumps, wedges, cylinders, squares, rectangular prisms, or any combination thereof. The thermoset foam may also be in the form of a shell. Said shell may be open or closed, and may be any shape, even complex and/or irregular shapes. In preferred embodiments, said shell is in the form of a tube, a prism, a cone, or a hyperboloid, and it may be beveled.

Properties, Uses and Applications of the Thermoset Foam

As mentioned above the thermoset foam is made of a thermoset and is highly and openly porous. This confers mechanical and acoustic properties to the foam that makes it suited for various applications. The thermoset foam can thus be conceived of as an acoustic foam with good mechanical properties.

First, the high open porosity of the thermoset foam confers acoustic properties to the foam. Indeed, in embodiments, the form has an absorption coefficient of about 0.6 or more over a frequency range of about 1000 (or about 1500) to about 6500 Hz. In embodiments, the form has a normalized resistance (real part of the acoustic impedance normalized with respect to the characteristic acoustic impedance of air at 0° C.) of about 5 or less over a frequency range of about 1000 to about 6400 Hz. In other words, the foams are highly absorbent and have low resistance, which are characteristics of a good acoustic material.

Thus, the acoustic properties of the foam make it suitable for use as an acoustic foam, that is a foam used (at least in part) to absorb sound. Indeed, acoustic foams are used for acoustic treatment. They attenuate airborne sound waves. Acoustic foams are typically used in a variety of ways, for example attached to walls, ceilings, doors, and other features of e.g. a room, to control noise levels, vibration, and echoes. In other words, the foam can be used as a sound absorbing material.

Generally speaking, there is provided herein the use of the thermoset foam as a sound absorbing material, such as an acoustic foam, which is a material that dissipates sound. Sound absorption is defined as the process by which the intensity of sound is diminished by the conversion of the energy of the incident sound wave into heat. The conversion of the incident energy is mainly achieved through the viscous friction due to the motion or air particles as well as thermal exchange with pores walls. Therefore, the part of acoustic energy that strikes a material is dissipated and is not reflected back, nor is it transmitted through the material. Sound absorbing materials are used to control or reduce noise, vibration, and echoes. Therefore, there is provided herein the use of the above thermoset foam to absorb sound, i.e. as a sound absorbing material.

Secondly, the fact that the foam is a thermoset, depending on the exact nature of the thermoset and as long as the porosity of the foam is not excessive, confers the foam with advantageous mechanical properties. Conventional polymeric acoustic foams are generally soft and easily compressed, making them unsuitable for mechanically challenging applications. In addition, conventional polymer materials with strong mechanical properties do not generally possess the acoustic properties of the thermoset foam. For example, when compared to thermoplastic porous foams, in particular thermoplastic acoustic foams, the thermoset foam of the present invention possesses a higher Young's modulus, a higher modulus of compression, a higher breaking stress, and/or a higher impact resistance, and/or it is more resistant to chemicals, high temperatures, and/or UV radiation. In embodiments, the foam of the invention has a compression modulus of about 8 MPa or more, for example between 8 and 75 MPa, preferably 10 MPa or more (e.g. 10 to 75 MPa).

The above mechanical properties make the thermoset foam suitable for mechanically challenging applications, for example those in which the foam must bear a load, resist relatively elevated temperatures (e.g. compared to thermoplastic acoustic foams), resist impacts, retain its shape when under pressure, have a long useful life, etc.

Therefore, there is provided herein the use of the above thermoset foam as a component of an assembly, for example a building, a vehicle (cars, trucks, trains, aircrafts (including airplanes and helicopters), etc.), a watercraft (boats, ships, submarines, etc.), or a machine (e.g. electricity production unit, air conditioner, etc.). In embodiments, the component is a structural component of the assembly, that is a component that contributes to the maintenance of the assembly structural integrity. There is thus provided a component of such assembly (building, a vehicle, watercraft, machine, etc.), preferably a structural component thereof, comprising, or consisting of, the thermoset foam. In preferred embodiments, the thermoset foam can be used in aircraft engines; aircraft floors and fuselages; rail and road transport vehicles; as a construction material; in buildings (walls, ceilings, floors, etc.); and in filters (including ventilation and air handling systems).

In preferred embodiments, the thermoset foam is used in applications, such as the above, that take advantage of both its acoustic and mechanical properties. In particular, in the above assembly, the foam can be used to reduce noise, vibration and/or echoes within the assembly (i.e. the car, the train car, the plane, etc. so as to increase the comfort of the passengers) or without the assembly (i.e. the air conditioning unit so as to avoid noise pollution around the unit).

In particular, because of the mechanical properties of the thermoset foam, it is possible and advantageous to replace a pre-existing component of an assembly system by a similar component made of the thermoset foam rather than add a supplementary component made of the thermoset foam to the assembly. Herein, the action of conferring sound absorption properties to a pre-existing component of an assembly is called the acoustic functionalization of this component. In a non-limiting example, to confer sound absorption properties to the fuselage of an airplane, it could be advantageous to replace one of the layers constituting the fuselage by a similar layer made of the thermoset foam. This would confer the desired acoustic properties, avoid compromising the mechanical properties, and possibly reduce the weight of the fuselage. Of course, it is also possible to simply add a layer of the thermoset foam to the fuselage of the airplane. This would confer the desired acoustic properties, avoid compromising the mechanical properties, but increase the weight of the fuselage.

In embodiments of any of the above, the thermoset foam of the present invention is integrated into composites and various other materials. The manner in which the openly porous acoustic foam is integrated, as well as the choice of composite or other material, depends on the desired properties of the resulting material. In preferred embodiments, the thermoset foam is integrated into composite sandwich structures.

Advantages of the Invention

In one or more embodiments, the present invention may present one or more of the following advantages.

The acoustic properties of the thermoset foams of the present invention can be tailored to target a wide range of frequencies either separately or simultaneously. Moreover, these foams can be used in other fields of engineering, such as construction and transportation.

The method of the present invention is also relatively simple and produces highly and openly porous thermoset foams with improved acoustic properties and significantly lower manufacturing costs (compared to metal foams). In addition, the foams produced by this method are highly absorbent and have low resistance, which is characteristic of good acoustic material.

The mechanical properties of the thermosetting resins are clearly superior to those of biodegradable and thermoplastic polymers. This makes it possible to envisage the acoustic functionalization of structural parts produced by this method. Further, the thermoset foams of the present invention possess a high Young's modulus, a high modulus of compression, a high breaking stress, and they are resistant to impact, chemicals, high temperatures, and UV radiation, especially when compared to thermoplastics.

The technique also applies to a wide variety of thermosetting resins making it a versatile process that can produce different foams depending on the desired application.

Moreover, this invention provides a simple method to produce the following:
  low cost acoustic foams;
  foams with open porosity with a porosity rate that may be greater than 90% and therefore very light weight foams;
  foams with a gradient of porosity and/or a gradient of materials, in which the gradient can be controlled and optimized for specific applications;
  acoustic foams with suitable mechanical properties for a wide range of applications; and
  acoustic foams integrated into composite sandwich structures.

Definitions

The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

Herein, the term "about" has its ordinary meaning. In embodiments, it may mean plus or minus 10% or plus or minus 5% of the numerical value qualified.

Unless otherwise defined, all technical and scientific terms used herein have the same meaning as commonly understood by one of ordinary skill in the art to which this invention belongs.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

EXAMPLE 1

Openly Porous Acoustic Foams

Experimental Details
The present invention is illustrated in further details by the following non-limiting examples.

Figure 2:
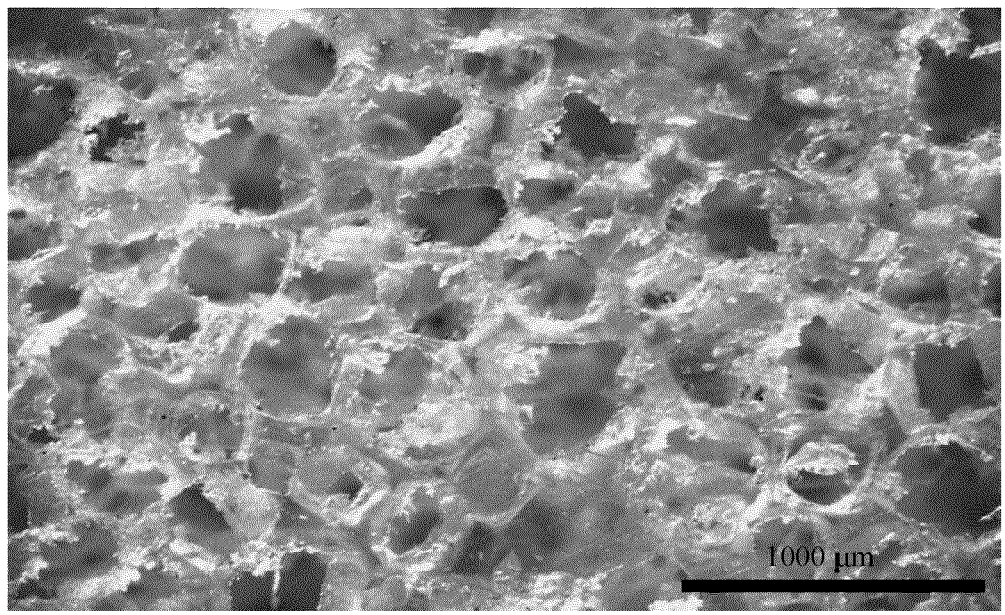
FIG. 2 shows a thermoset foam made using PR520.

Various openly porous acoustic foams were made and their acoustic properties were measured using an impedance tube of 30 mm in diameter with two upstream microphones and rigid backing wall (absorption configuration). The openly porous acoustic foams had a diameter of 30 mm and a thickness varying from 10 mm to 35 mm. The thermosetting resins used for these tests were Derakane 411-350, DER383, Cycom PR520, and Sympoxy 1960G. FIGS. 1 and 2 are images taken with an optical microscope which show structured foams made using DER383 and PR520, respectively, with open pores between 200 and 400 microns in size. The tests carried out with the impedance tube gave an absorption coefficient of between 0.6 and 0.95 and a resistance (real part of the acoustic impedance) of less than 5 kg/s·m$^2$ over a frequency range of 500 to 6400 Hz. These results demonstrate that the foams produced by this method are highly absorbent and have low resistance, which is characteristic of good acoustic material.

Each openly porous acoustic foam was made using the same general process as shown in FIG. 3. The thermosetting resin was mixed with selected sodium chloride crystals in defined proportions. The mixture thus obtained was then compressed and brought to temperature in order to complete the polymerization. The majority of the tests were carried out at pressures between 60 MPa and 65 MPa. The details regarding the making of each foam are presented in Table 1.

Figure 4:
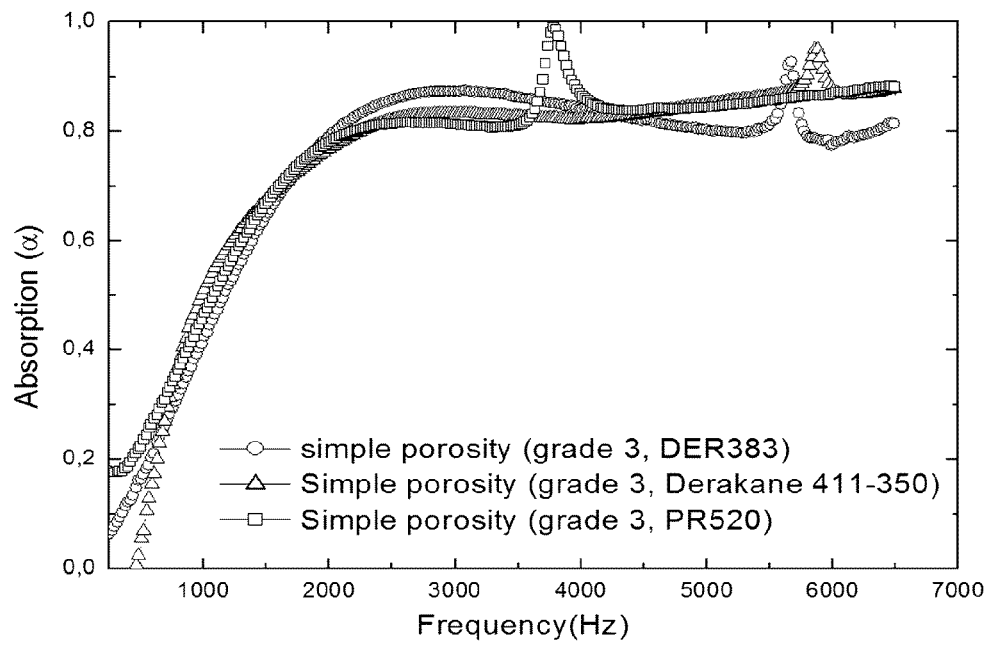
FIG. 4 shows absorption coefficients for thermoset foams with uniform porosities (i.e. without gradient of porosities).
Figure 5:
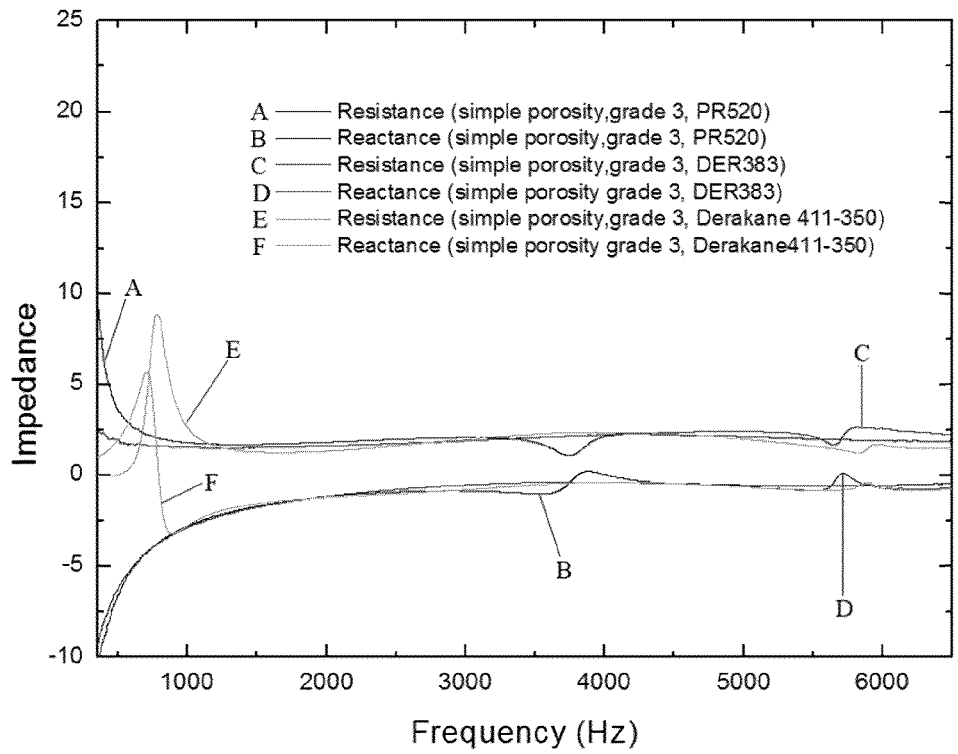
FIG. 5 shows acoustic impedance (resistance and reactance) for thermoset foams with uniform porosities (i.e. without gradient of porosities).
Figure 6:
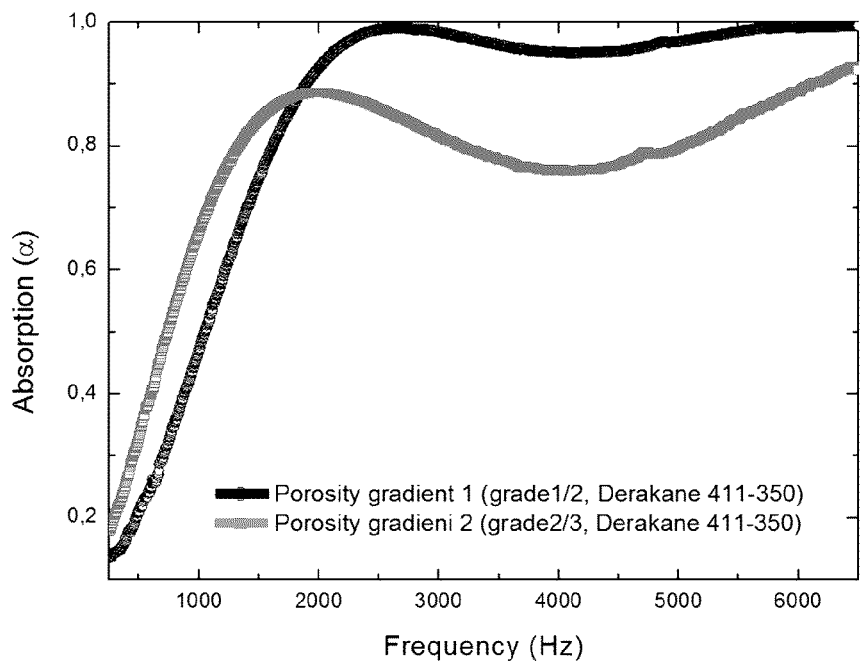
FIG. 6 shows absorption coefficients for thermoset foams with gradients of porosity.
Figure 7:
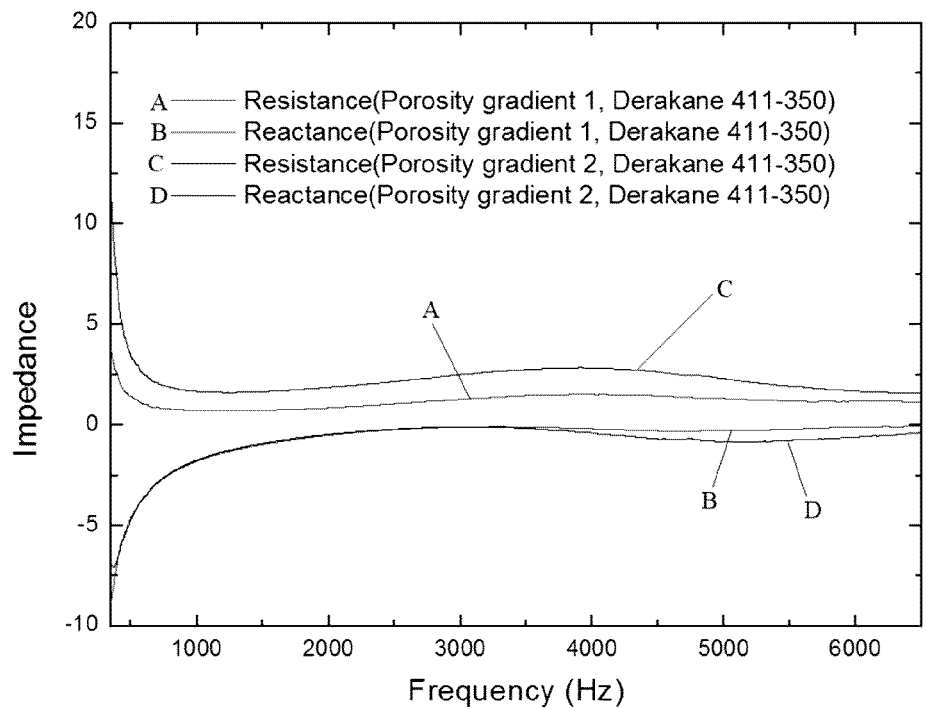
FIG. 7 shows acoustic impedance (resistance and reactance) for thermoset foams with gradients of porosity.

The polymerized intermediate material was then immersed in a heated water bath to dissolve the sodium chloride crystals and then dried. The list of thermosetting resins used, as well as the size of the sodium chloride crystals, is as follows:

List of resins used:
Resin 1 (DER 383)
Epoxy resin based on Epichlorohydrin and Bisphenol A
Curing temperature: 100° C.
Consistency: Liquid
Viscosity: 9000 mPa.s
Resin 2 (DERAKANE 411-350)
Bisphenol-A Ester Vinyl Resin
Curing temperature: Ambient
Consistency: liquid
Viscosity: 370 mPa.s
Resin 3 (Cycom PR520)
High modulus epoxy resin
Curing temperature: above 180° C.
Consistency: liquid
Viscosity: 500 cPa.s
Resin 4 (Sympoxy 1960 G)
Epoxy resin
Curing temperature between 85° C. and 150° C.
Consistency: fine powder
List of Crystals Used
Sodium chloride (NaCl) (cooking salt) of different sizes of crystals
  Grade of crystals obtained by sieving (sorting):
  Grade 1: 1000 microns-2000 microns
  Grade 2: 800 microns-900 microns
  Grade 3: 300 microns-500 microns Using the above thermosetting resins and sodium chloride particles, various openly porous acoustic foams were obtained, the properties of which are described in Tables 2 and 3. Absorption coefficients and acoustic impedance for various thermoset foams are shown in FIGS. 4-7. Specifically, FIG. 4 shows absorption coefficients for thermoset foams that are uniform (i.e. without a gradient of porosity); FIG. 5 shows acoustic impedance (resistance and reactance) for thermoset foams that are uniform (i.e. without a gradient of porosity); FIG. 6 shows absorption coefficients for thermoset foams with gradients of porosity; and FIG. 7 shows acoustic impedance (resistance and reactance) for thermoset foams with gradients of porosity.

TABLE 1

Process parameters

| Structure | Resin | Crystal:Resin ratio | Compaction pressure (MPa) | Curing temperature | Additives | Leaching time |
|---|---|---|---|---|---|---|
| Porosity gradient 1 (grade 1/grade 2) | Derakane 411-350 | 80:20 | 60 | Ambient temperature | No | 2 days Not heated |
| Porosity gradient 2 (grade 2/grade 3) | Derakane 411-350 | 80:20 | 60 | Ambient temperature | No | 2 days Note heated |
| Uniform porosity grade 1 | Derakane 411-350 | 80:20 | 60 | Ambient temperature | No | 2 days Note heated |
| Uniform porosity grade 2 | Derakane 411-350 | 80:20 | 60 | Ambient temperature | No | 2 days Not heated |
| Uniform porosity grade 3 | Derakane 411-350 | 80:20 | 65 | Ambient temperature | No | 2 days Not heated |
| Uniform porosity grade 3 | DER383 | 80:20 | 60 | 100° C. | No | 3 days Not heated |
| Uniform porosity grade 3 | PR520 | 80:20 | 65 | 100° C. | No | 3 days Heated |
| Uniform porosity grade 3 | Sympoxy 1960G | 90:10 | 65 | 95° C. | No | 1 day Not heated |

TABLE 2

| Structure | Resin | Thickness of sample (mm) | Mass of sample (g) |
|---|---|---|---|
| Porosity gradient 1 | Derakane 411-350 | 22.8 | 2.5 |
| Porosity gradient 2 | Derakane 411-350 | 20.7 | 3.1 |
| Uniform Porosity, Grade 1 | Derakane 411-350 | 18.40 | 2.1 |
| Uniform Porosity, Grade 2 | Derakane 411-350 | 21.20 | 3.6 |
| Uniform Porosity, Grade 3 | Derakane 411-350 | 11.45 | 2.0 |
| Uniform Porosity, Grade 3 | DER383 | 14.8 | 2.0 |
| Uniform Porosity, Grade 3 | PR520 | 14.7 | 1.0 |
| Uniform Porosity, Grade 3 | Sympoxy 1960G | 17 | — |

TABLE 3

| Structure | Resin | Foam density (g/cm$^3$) | Porosity (%) | Mean normalized absorption coefficient | Mean impedance (dB) (resistance) | Compression Modulus (MPa) |
|---|---|---|---|---|---|---|
| Uniform Porosity, Grade 3 | DER383 | 0.18 | 85 | 0.6-0.9 | 1-5 | — |
| Uniform Porosity, Grade 3 | PR520 | 0.10 | 91 | 0.7-0.9 | 1-5 | — |
| Uniform Porosity, Grade 3 | Derakane 411-350 | 0.19 | 83 | 0.6-0.9 | 1-5 | ~60 |
| Uniform Porosity, Grade 2 | Derakane 411-350 | 0.24 | 79 | 0.6-0.8 | 1-5 | — |
| Uniform Porosity, Grade 1 | Derakane 411-350 | 0.15 | 86 | 0.6-0.9 | 1-5 | ~12 |
| Porosity gradient 1 | Derakane 411-350 | 0.15 | 86 | 0.8-0.95 | 1-5 | — |
| Porosity gradient 2 | Derakane 411-350 | 0.21 | 81 | 0.7-0.9 | 1-5 | ~60 |

Conclusions

In summary, various openly porous acoustic foams were made using the same process. The selected thermosetting resin was mixed with selected sodium chloride crystals in defined proportions. The mixture thus obtained was then compressed and brought to temperature in order to complete the polymerization. The polymerized intermediate material was then immersed in a heated water bath to dissolve the sodium chloride crystals and then dried. The majority of the tests were carried out at pressures between 60 MPa and 65 MPa. The tests carried out with the impedance tube gave an absorption coefficient of between 0.6 and 0.95 and a normalized resistance (real part of the acoustic impedance normalized with respect to the characteristic acoustic impedance of air at 0° C.) of less than 5 kg/s·m² over a frequency range of 500 to 6400 Hz. These results demonstrate that the foams produced by this method are highly absorbent and have low resistance, which is characteristic of good acoustic material.

EXAMPLE 2

Foams were prepared as described in Example 1 using Derakane 411-350 and salt crystals of 1000 μm in size in a crystal:resin ratio of 80:20. The pressure applied before curing was varied between from 20 to 65 MPa. The resin was cured at room temperature. The leaching lasted 2 to 4 days (without heat).

Figure 8:
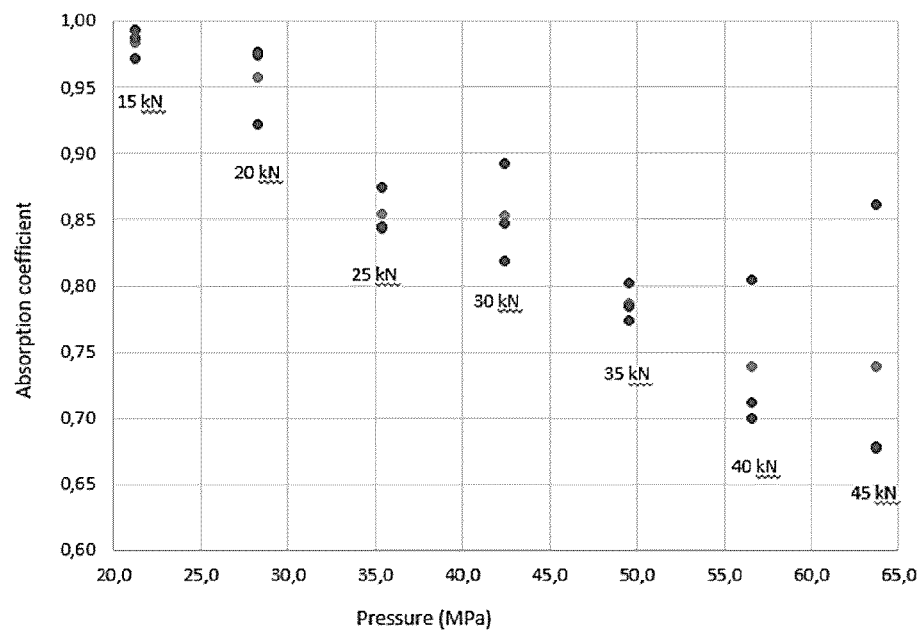
FIG. 8 shows the global absorption coefficient of a foam produced using Derakane 411-350 and salt crystals of 1000 µm in size as a function of the pressure applied.
Figure 9:
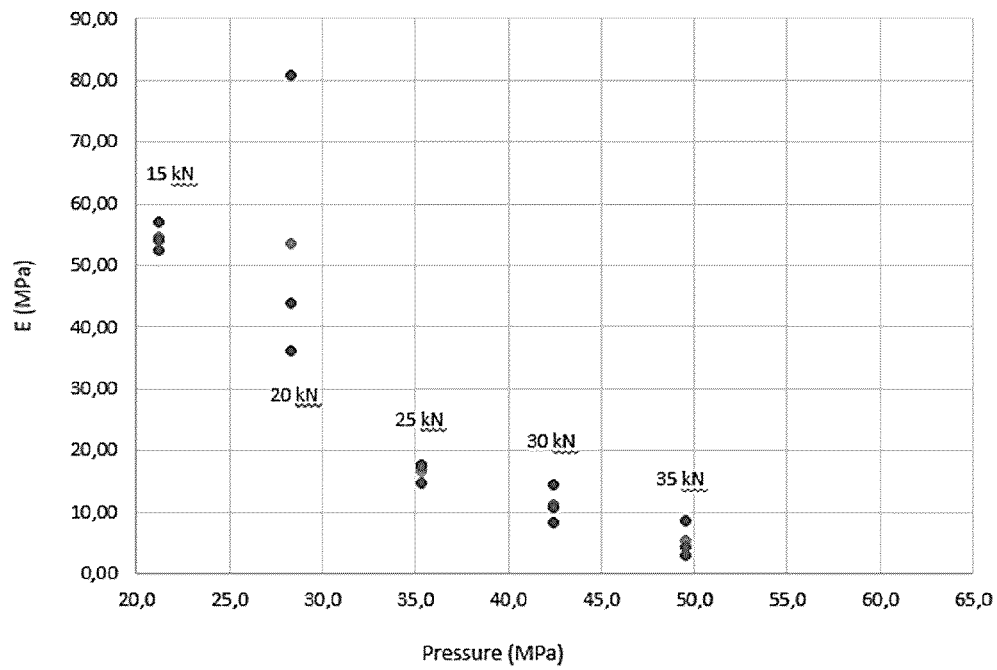
FIG. 9 shows the compression modulus of a foam produced using Derakane 411-350 and salt crystals of 1000 µm in size as a function of the pressure applied.

The acoustic and mechanical properties of the foams (absorption coefficient and compression modulus) were measured. FIG. 8 shows the global absorption coefficient of the foam produced as a function of the pressure applied. FIG. 9 shows the compression modulus of the foam produced as a function of the pressure applied.

EXAMPLE 3

Foams were prepared as described in Example 1 using Derakane 411-350 and salt crystals of 1000 μm in size in a crystal:resin ratio of 80:20. The quantity of salt used was varied. The resin was cured at room temperature. The leaching lasted 2 to 4 days (without heat).

Figure 10:
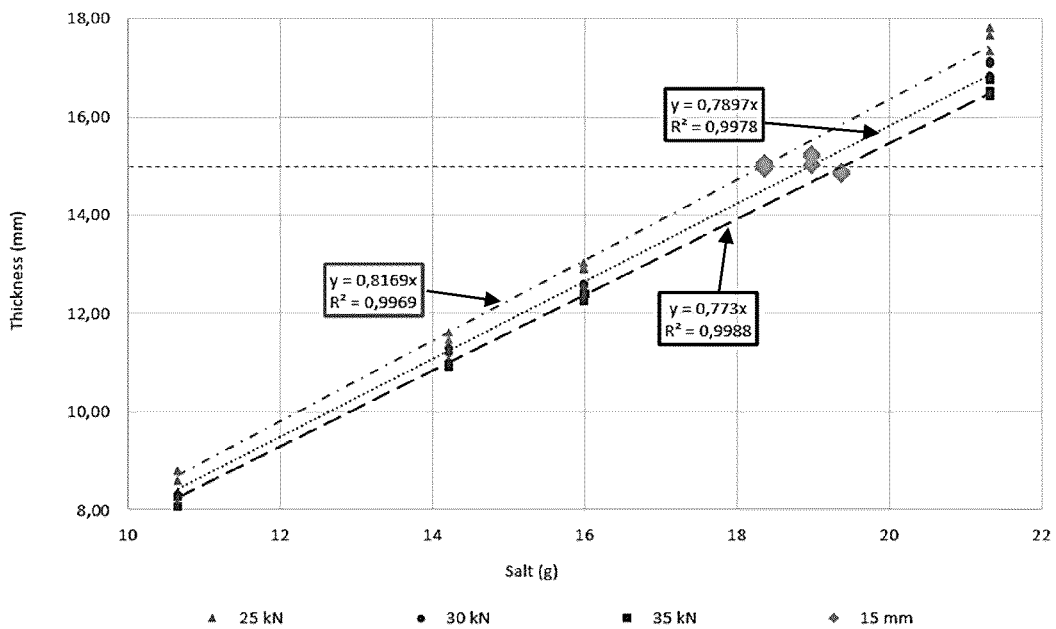
FIG. 10 shows thickness of a foam produced using Derakane 411-350 and salt crystals of 1000 µm in size as a function of the quantity of salt used, for three different pressures.

The thickness of the resulting foams obtained with the three different pressures (25, 30, and 35 kN) was measured and is shown in FIG. 10. The thickness increases linearly with the quantity of salt used. Linear regressions curves were calculated for each pressure tested (also shown on FIG. 10) and used to calculate the quantity of salt used required to obtain a sample of a given thickness (15 mm). Then, foams were produced using the calculated quantity of salt used and their thickness measured. The desired thickness (15 mm) was indeed observed—see big lozenges on FIG. 10.

EXAMPLE 4

Foams were prepared as described in Example 1 using Derakane 411-350 and salt crystals of 1000 μm in size. The resin and crystals were mixed into four different crystal:resin weight ratios (70:30, 75:25, 80:20, and 85:15). The resin was cured at room temperature. The leaching lasted 2 to 4 days (without heat).

Figure 11:
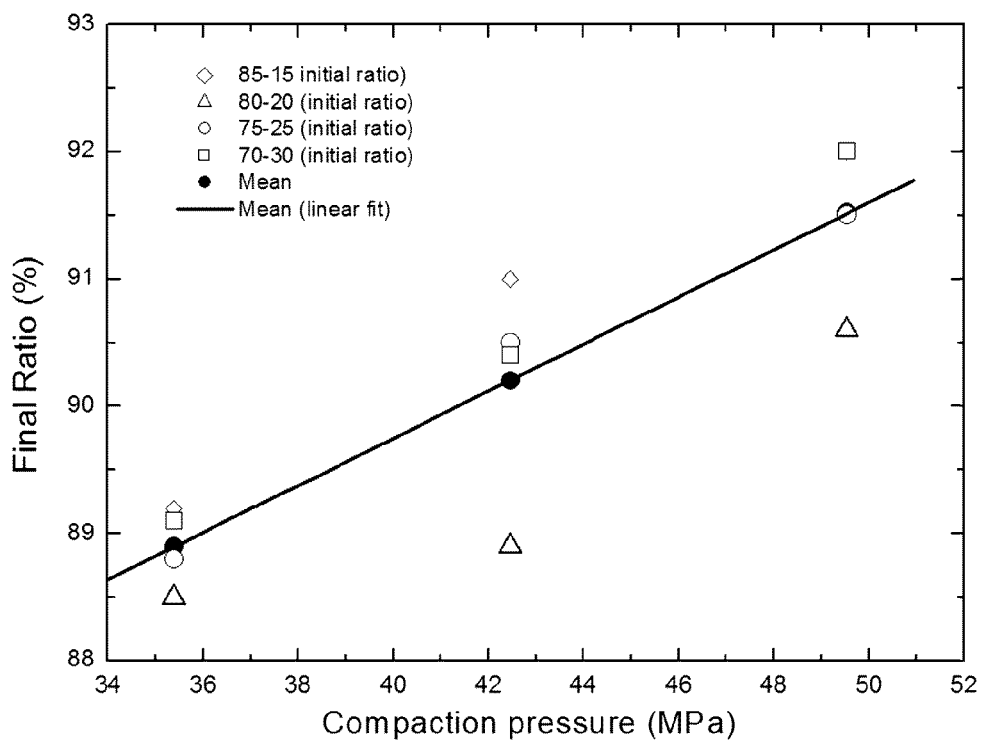
FIG. 11 shows the final crystal:resin weight ratio of mixture of Derakane 411-350 and salt crystals of 1000 µm in size as a function of the pressure applied for different original crystal:resin weight ratios.
Figure 12:
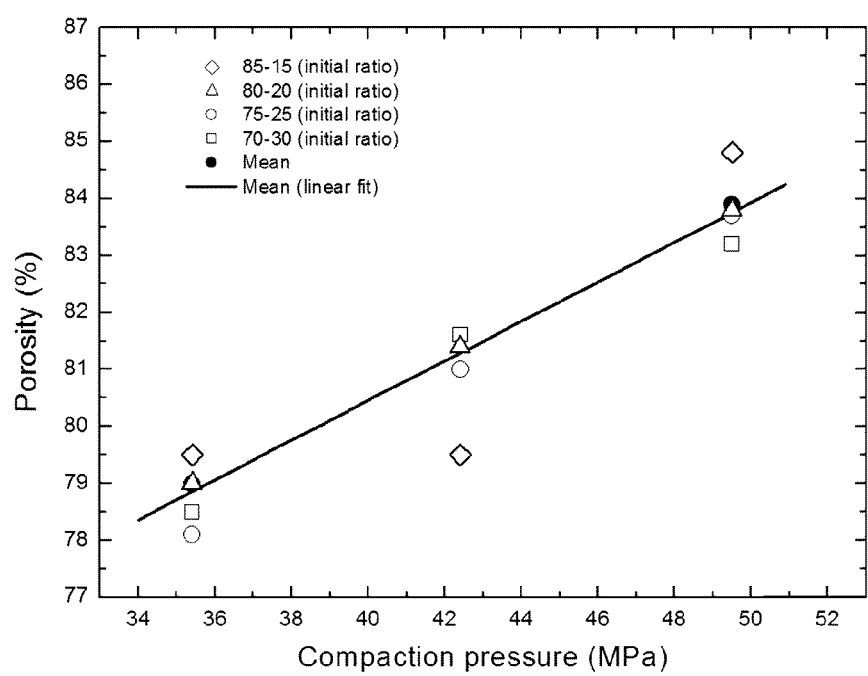
FIG. 12 shows the porosity of the foam produced using Derakane 411-350 and salt crystals of 1000 µm in size as a function of the pressure applied for different original crystal:resin weight ratios.

The crystal:resin weight ratios of the material obtained after evacuating excess resin but before curing (FIG. 11) and the porosity of the foams produced (FIG. 12) were measured as a function of the pressure applied. For a given compaction pressure, the original crystal:resin weight ratio has no discernable influence on the final crystal:resin weight ratio. The final crystal:resin weight ratio increased with pressure however. The original crystal:resin weight ratio has no discernable influence on the porosity of the foam. The porosity of the foam increased with pressure however.

EXAMPLE 5

Foams were prepared as described in Example 1 using Derakane 411-350 and salt crystals of 300, 500, or 1000 μm in size in a crystal:resin ratio of 80:20. The pressure was 35 MPa (i.e. about 25 kN). The resin was cured at room temperature. The leaching lasted 2 to 4 days (without heat).

Figure 13:
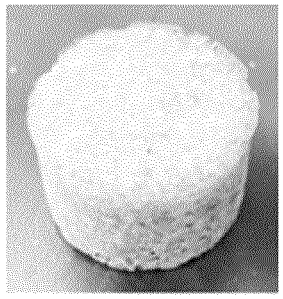
FIG. 13 shows optical images with increasing magnification of foams prepared using Derakane 411-350 and salt crystals of a) 1000 µm, b) 500 µm, and c) 300 µm in size.
Figure 13:
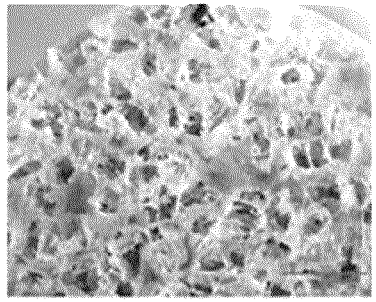
Figure 13:
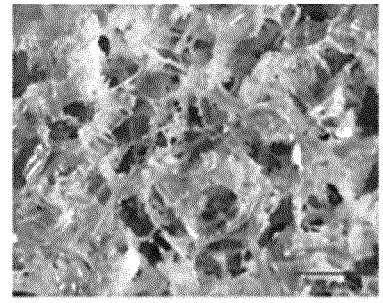
Figure 13:
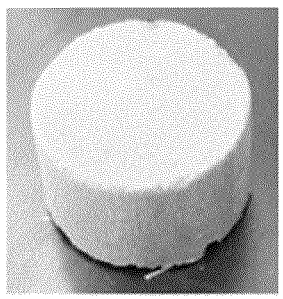
Figure 13:
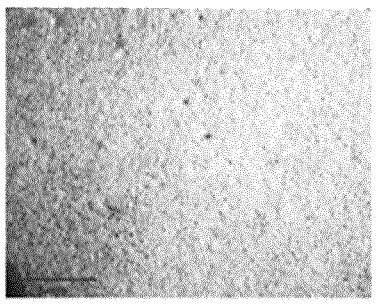
Figure 13:
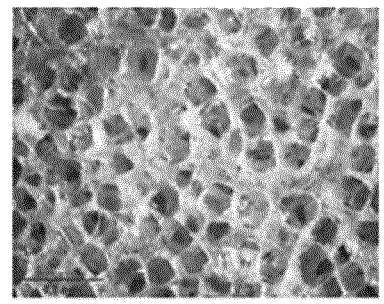
Figure 13:
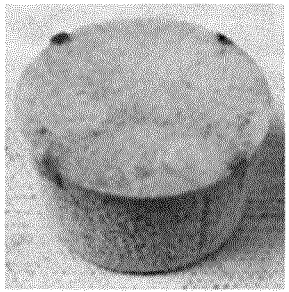
Figure 13:
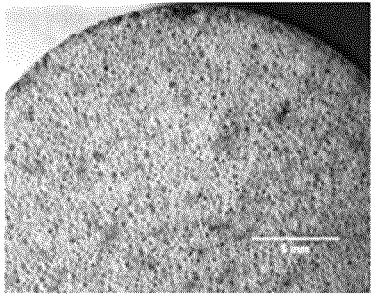
Figure 13:
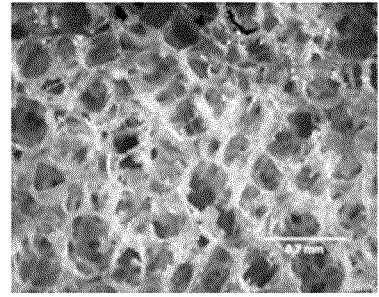

The structure of the forms obtained is shown in FIG. 13, a) crystals of 1000 μm, b) crystals of 500 μm, and c) crystals of 300 μm.

The compression modulus of each foam was measured. The compressive modulus tended to decrease with increasing crystal size. The results are shown in the following table:

| Crystal size | 1000 μm | 500 μm | 250 μm |
|---|---|---|---|
| Compression modulus | 8-15 MPa | 30-70 MPa | 30-85 MPa |

The acoustic properties of the foams (absorption coefficient) of the foams was measured. Regardless the crystal size, the acoustic absorption coefficient ranged between 0.7 and 0.9.

EXAMPLE 6

Foams were prepared as described in Example 1 using Dow Corning 3145 RTV (silicon elastomer, curing at room temperature) and salt crystals of 300-500 μm in size. The resin and crystals were mixed into a crystal:resin weight ratios of 80:20. The pressure was 60 MPa. The leaching lasted 3 or 4 days.

Figure 14:
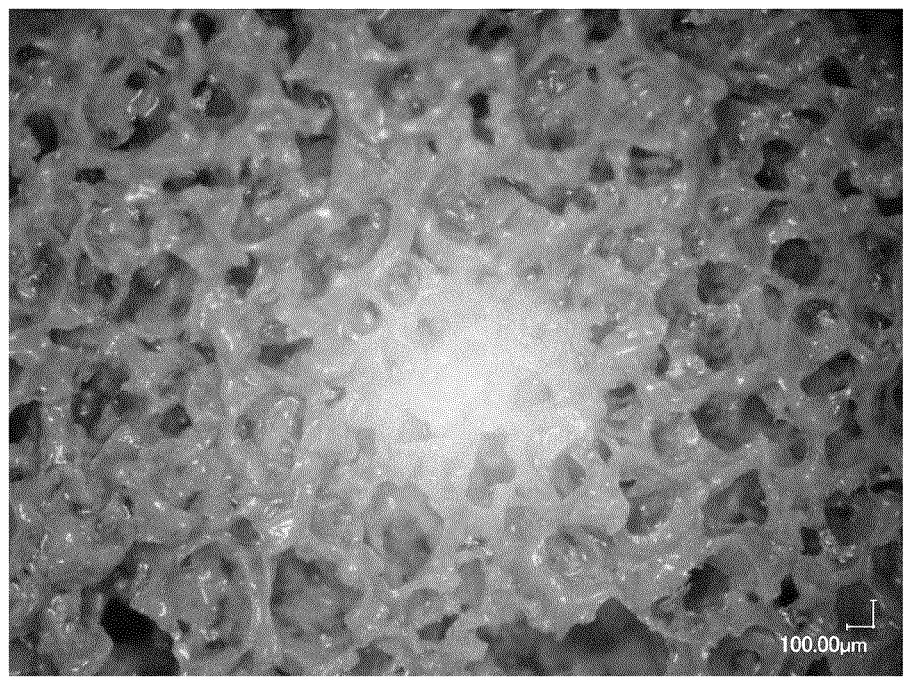
FIG. 14 is a micrograph of the foam of Example 6.

The foam obtained is shown in FIG. 14.

EXAMPLE 7

Foams were prepared as described in Example 1 using Sympoxy 1960G (epoxy resin in powder form) and salt crystals of 300-500 μm in size. The resin and crystals were mixed into a crystal:resin weight ratios of 80:20. The pressure was 60 MPa. After compression, the resin was cured at 150° C. The leaching lasted 3 or 4 days.

Figure 15:
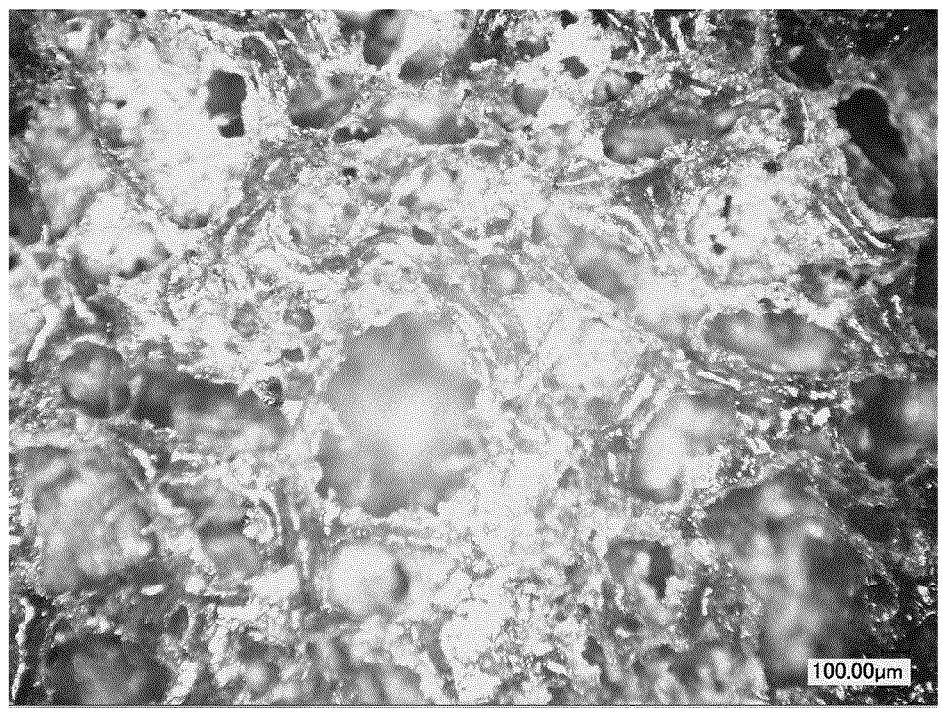
FIG. 15 is a micrograph of the foam of Example 7.

The foam obtained is shown in FIG. 15.

The scope of the claims should not be limited by the preferred embodiments set forth in the examples, but should be given the broadest interpretation consistent with the description as a whole.

REFERENCES

The present description refers to a number of documents, the content of which is herein incorporated by reference in their entirety. These documents include, but are not limited to, the following:

Jin et al. (1990) Method of producing lightweight foamed metal. U.S. Pat. No. 4,973,358.

Kenny et al. (1994) Process for shape casting of particle stabilized metal foam. U.S. Pat. No. 5,281,251.

Niebyski et al. (1974) Preparation of metal foams with viscosity increasing gases. U.S. Pat. No. 3,816,952.

Sang et al. (1994) Process for producing shaped slabs of particle stabilized foamed metal. U.S. Pat. No. 5,334,236.

Akiyama et al. (1987) Foamed metal and method of producing same. U.S. Pat. No. 4,713,277.

Elliot, J. C. (1956) Method of producing metal foam. U.S. Pat. No. 2,751,289.

Wadley, H. N. G. (eds) *Porous and Cellular Materials for Structural Application,* Materials Research Society Proceedings, Vol. 521, MRS, Warrendale, Pa., USA.

Miyoshi, T., Itoh, M., Akiyama, S. and Kitahara, A. (1998) *Aluminum foam, ALPORAS, the production process, properties and applications,* Shinko Wire Company, Ltd, New Tech Prod. Div., Amagasaki, Japan.

Baumeister, J. (1988) Methods for manufacturing foamable metal bodies. U.S. Pat. No. 5,151,246.

Yu, C.-J. Eifert, H. (1998) Metal foams. *Advanced Materials & Processes* November, 45-47.

ERG (1998) Duocel aluminum foam. *ERG Corporate Literature and Reports,* 29 Sep. <http://ergaerospace.com/lit.html>

Sharpalov, Yu (1993) Method for manufacturing porous articles. U.S. Pat. No. 5,181,549.

Sharpalov. (1994) Porous metals. *MRS Bulletin,* Apr. 24-28.

Babjak et al. (1990) Method of forming nickel foam. U.S. Pat. No. 4,957,543.

Kearns, M. W., Blekinsop, P. A., Barber, A. C. and Farthing, T. W. (1988) Manufacture of a novel porous metal. *The International Journal of Powder Metallurgy* 24: 59-64.

Kearns, M. W., Blekinsop, P. A., Barber, A. C. and Farthing, T. W. (1988) Novel porous titanium. Paper presented at Sixth World Conference on Titanium, Cannes, France.

Schwartz, D. S. and Shih, D. S. (1998) Titanium foams made by gas entrappment. In Shwartz, D. S., Shih, D. S., Evans, A. G. and Wadley, H. N. G. (eds) *Porous and Cellular Materials for Structural Application,* Materials Research Society Proceedings, Vol. 521, MRS, Warrendale Pa., USA.

Drury, W. J., Rickles, S. A. Sanders, T. H. and Cochran, J. K. (1989) Deformation energy absorption characteristics of a metal/ceramic cellular solid. In *Proceedings of TMS Conference on Light Weight Alloys for Aerospace Applications,* TMS-AIME, Warrendale, Pa., USA.

Lee et al. (1991) Method and apparatus for producing microshells. U.S. Pat. No. 5,055,240.

Torobin (1983) Method and apparatus for producing hollow metal microspheres and microspheroids. U.S. Pat. No. 4,415,512.

Uslu, C., Lee, K. J. Sanders, T. H. and Cochran, J. K. (1997) Ti-6Al-4V hollow sphere foams. In *Synthesis/Processing of Light Weight Metallic Materials II,* TMS, Warrendale, Pa., USA.

Mosanenzadeh S. G, Naguib H. E., Park C. B, Atalla N., (2015), Development, Characterization, and Modeling of Environmentally Friendly Open-Cell Acoustic Foam, J Mater Sci 50, 1248-1256

Kim T. K., Yoon J. J., Lee D. S., Park T. G., (2006) Gas foamed open porous biodegradable polymeric microspheres, Biomaterials 27, 152-159

The invention claimed is:

1. A method of manufacturing an openly porous thermoset foam, the method comprising the steps of:
   i) mixing a thermosetting resin and crystals to form a mixture;
   ii) applying pressure to the mixture to expel excess thermosetting resin, thereby producing a network of crystals touching each other with the thermosetting resin in the interstices between the crystals of said network;
   iii) curing the thermosetting resin in the mixture under pressure to produce a cured material; and
   iv) contacting the cured material with a solvent for the crystals, thereby leaching the crystals out of the cured material and producing said openly porous thermoset foam.

2. The method according to claim 1, wherein the thermosetting resin is a thermosetting plastic resin, is in the form of a solid powder, and/or is a bi-component resin.

3. The method according to claim 1, wherein the crystals are water-soluble and the solvent is water or an aqueous solution.

4. The method according to claim 1, wherein the crystals are present in a crystal:thermosetting resin weight ratio of: about 75:25, about 80:20, about 85:15, about 95:5, or about 90:10.

5. The method according to claim 1 further comprising heating the mixture before step ii) to lower the viscosity of the thermosetting resin.

6. The method according to claim 1 wherein the applied pressure is between about 15 MPa.

7. The method according to claim 1, wherein the thermosetting resin is a chemically-curable resin and in the curing step, the thermosetting resin is cured by waiting and thus allowing curing to occur.

8. The method according to claim 1, wherein the thermosetting resin is a heat-curable resin and in the curing step, the thermosetting resin is cured by heating the mixture to the curing temperature of the thermosetting resin or above.

9. The method according to claim 1, wherein the thermosetting resin is a radiation-curable resin and in the curing step, the thermosetting resin is cured by exposing the thermosetting resin to curing radiation.

10. The method according to claim 1, wherein steps ii and iii partly overlap.

11. The method according to claim 1, wherein steps ii and iii are carried out consecutively.

12. The method according to claim 1, wherein the solvent with which the cured material is contacted is heated.

13. The method according to claim 1, wherein step iii) comprises;
   iii') completely or at least partially curing the thermosetting resin under pressure to produce an at least partially cured material in which the thermosetting resin has at least reached its gel point,
   iii") producing an additional at least partially cured material by;
   a) placing an additional mixture as defined in claim 1 adjacent to the at least partially cured material;
   b) applying pressure to the additional mixture to expel excess thermosetting resin of the additional mixture, leaving a network of crystals in the additional mixture touching each other with the thermosetting resin of the additional mixture in the interstices of said network;
   c) completely or at least partially curing the thermosetting resin in the additional mixture, under pressure, to produce an additional at least partially cured material in which the thermosetting resin of the additional mixture has at least reached its gel point;

iii''') optionally repeating step iii'') one or more times, each additional at least partially cured material produced in each step iii''') being formed adjacent to a previously formed at least partially cured material; and iii'''') if curing was partial in step iii') and step iii'' c), completing curing the thermosetting resin of the mixture and the additional mixture(s).

14. The method according to claim 1, further comprising tailoring the size and shape of pores created by leaching the crystals out of the cured material by varying the size and shape of the crystals.

* * * * *

UNITED STATES PATENT AND TRADEMARK OFFICE
CERTIFICATE OF CORRECTION

| | |
|---|---|
| PATENT NO. | : 11,548,994 B2 |
| APPLICATION NO. | : 16/466127 |
| DATED | : January 10, 2023 |
| INVENTOR(S) | : Edith Roland Fotsing et al. |

It is certified that error appears in the above-identified patent and that said Letters Patent is hereby corrected as shown below:

In the Claims

Column 28 Lines 30-31 Claim 6 should read:
6. The method according to claim 1 wherein the applied pressure is between about 15 MPa and about 65 MPa.

Signed and Sealed this
Fourteenth Day of February, 2023

Katherine Kelly Vidal
*Director of the United States Patent and Trademark Office*